United States Patent [19]
Slocum et al.

[11] Patent Number: 5,888,114
[45] Date of Patent: Mar. 30, 1999

[54] MODULAR STORAGE SYSTEM, COMPONENTS, ACCESSORIES, AND APPLICATIONS TO STRUCTURAL SYSTEMS AND TOY CONSTRUCTION SETS AND THE LIKE

[75] Inventors: Alexander H. Slocum, Bow, N.H.; Christopher M. Ho, Somerville, Mass.

[73] Assignee: AESOP, Inc., Concord, N.H.

[21] Appl. No.: 601,283

[22] Filed: Feb. 16, 1996

[51] Int. Cl.⁶ ................................................. A63H 33/08
[52] U.S. Cl. ...................... 446/128; 52/591.1; 446/118
[58] Field of Search .................................. 446/118, 128, 446/102; 52/591.1

[56] References Cited

U.S. PATENT DOCUMENTS

| | | | |
|---|---|---|---|
| 3,005,282 | 10/1961 | Christiansen | 446/128 |
| 3,162,973 | 12/1964 | Christiansen | 446/128 |
| 3,374,917 | 3/1968 | Troy | 52/591.1 X |
| 3,597,875 | 8/1971 | Christiansen | 446/128 |
| 3,873,225 | 3/1975 | Jakobsen et al. | 52/591.1 X |
| 4,429,506 | 2/1984 | Henderson | 52/591.1 |
| 4,740,189 | 4/1988 | Bertrand | 446/128 |
| 4,744,780 | 5/1988 | Volpe | 446/128 |
| 4,884,988 | 12/1989 | McMurray | 446/115 |
| 4,964,833 | 10/1990 | Suzuki | 446/118 |
| 4,964,834 | 10/1990 | Myller | 446/118 |
| 5,451,177 | 9/1995 | Gilman | 446/128 |
| 5,502,939 | 4/1996 | Zadok et al. | 52/592.1 X |

*Primary Examiner*—Carl D. Friedman
*Assistant Examiner*—Bett A. Aubrey
*Attorney, Agent, or Firm*—Rines and Rines

[57] ABSTRACT

The invention is concerned with the formation of modular units from individual plate-like elements and other elements with special interlocking joints at their ends that allow them to form cubes that can be grouped together to form storage "cubbies" and modular structural systems and toy construction sets and the like, wherein, in one embodiment, the plates are formed with one end having studs on a 45 degree angled surface, and the other end having receptacles or openings such as sockets on a 45 degree angled surface for interlocking with a second mating plate like the first, but in which the studs and sockets are interchanged, allowing a cube to be formed by two of each type of plate, with the use of studs and sockets on the surfaces allowing two or more such cubes to stick together; and wherein, in another embodiment, the cube is made from four identical plates, as by an extrusion process, where one end of a plate contains double male features, such as barb arrows, and the other end contains double corresponding female features that mate with the male features from other plates, whereby the male and female features allow the ends of the plates to slide into each other like a dovetail to form a cube, and with adjoining cubes sharing surfaces. Other variations are also disclosed, as well as novel extruded truss sections.

18 Claims, 29 Drawing Sheets

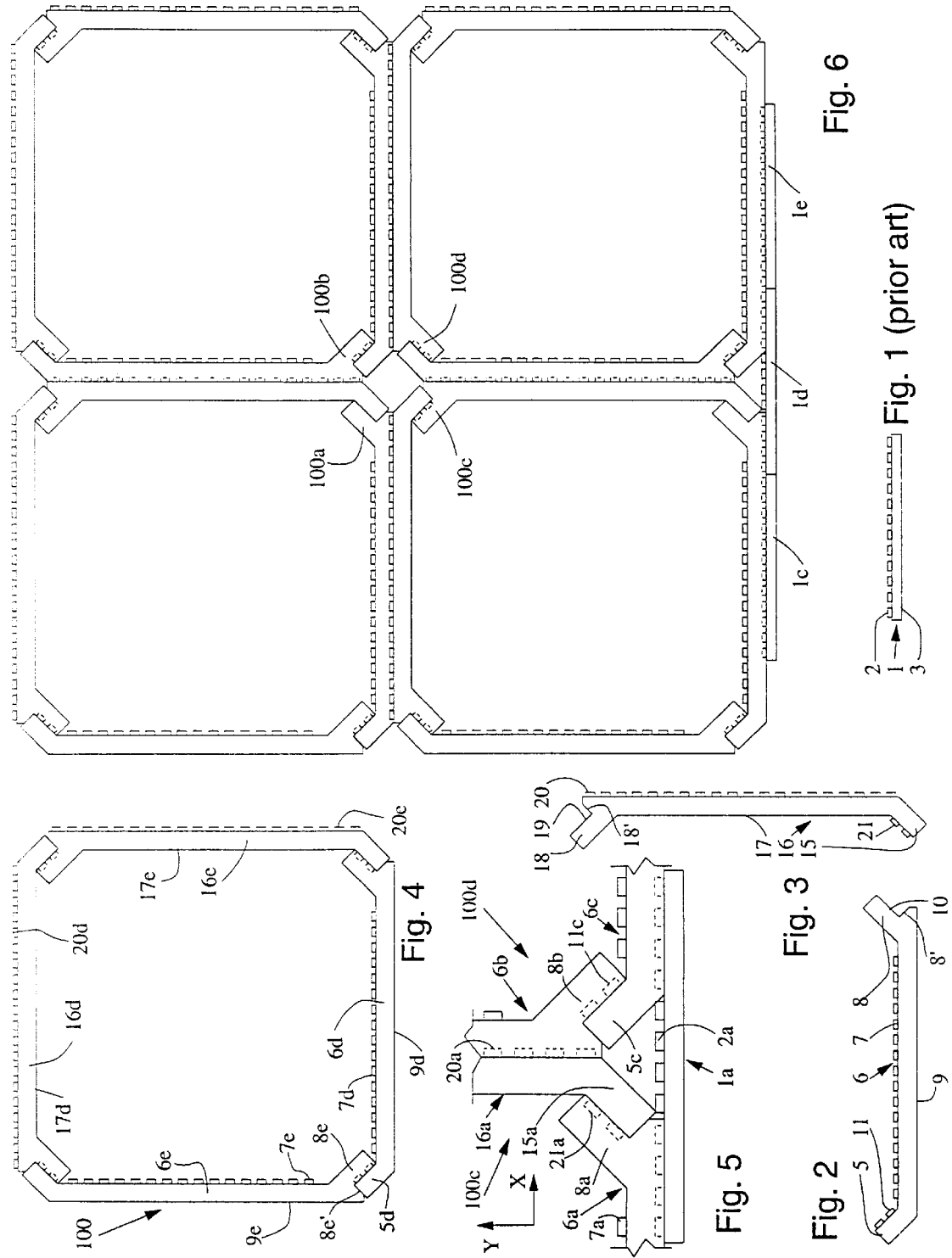

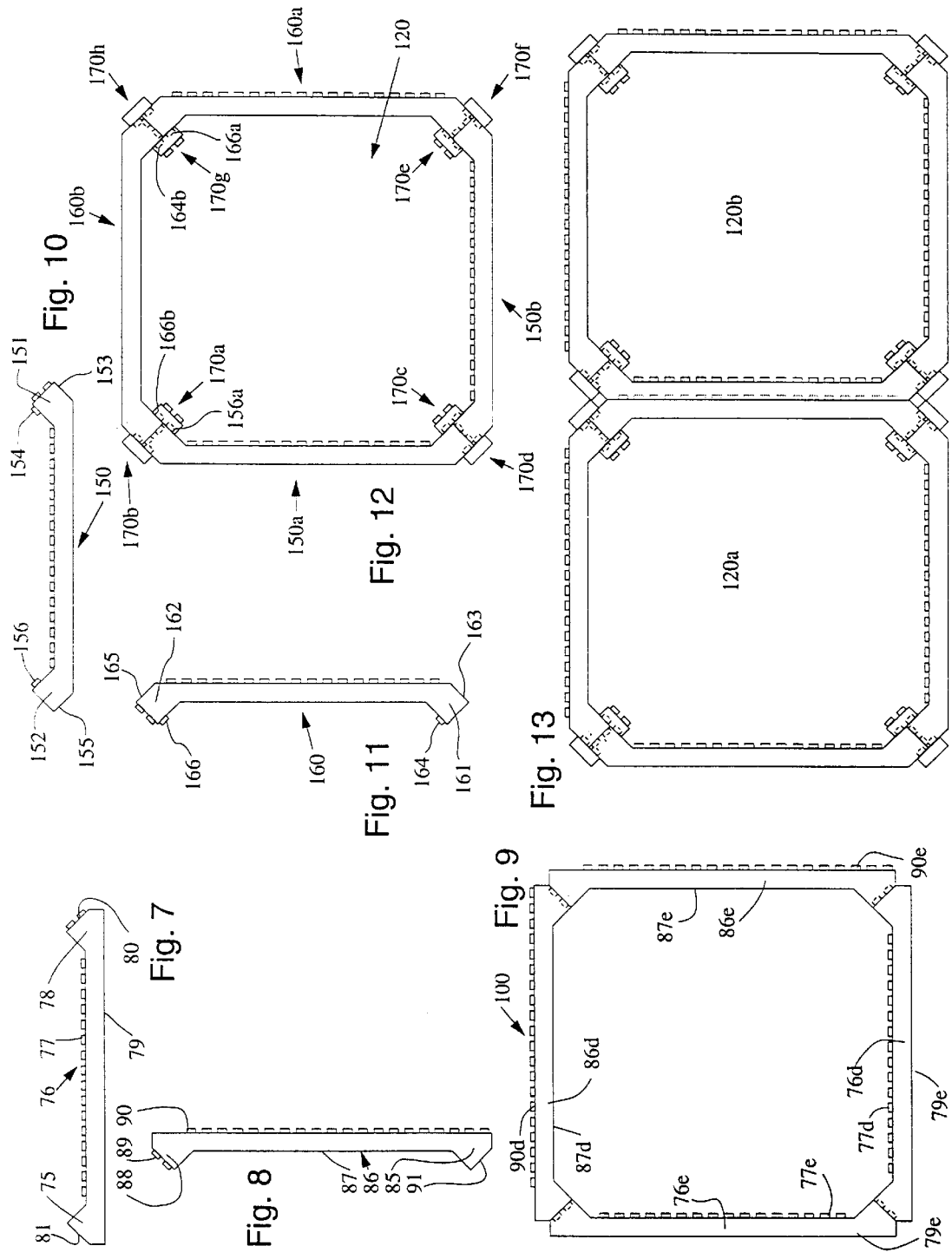

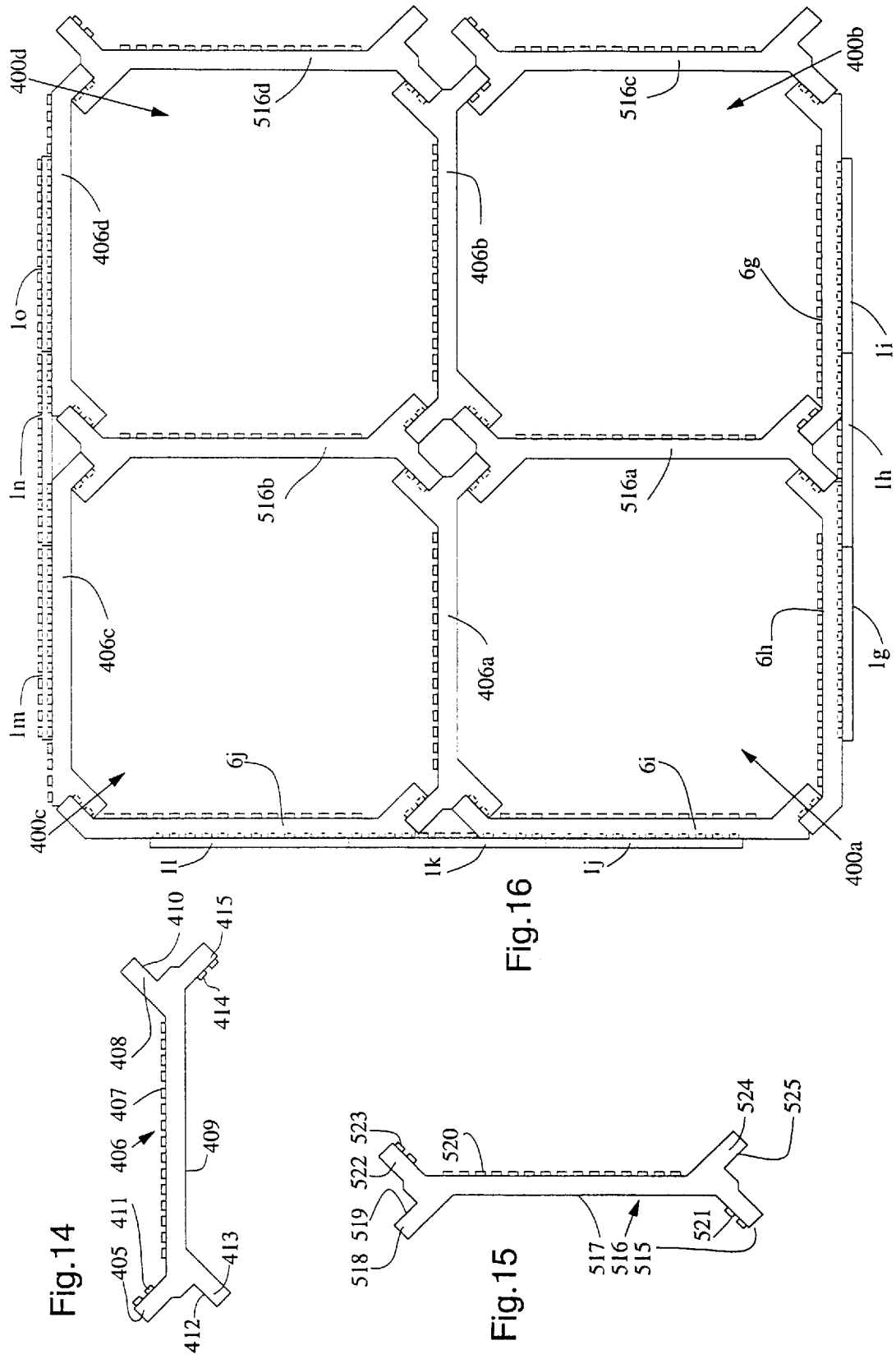

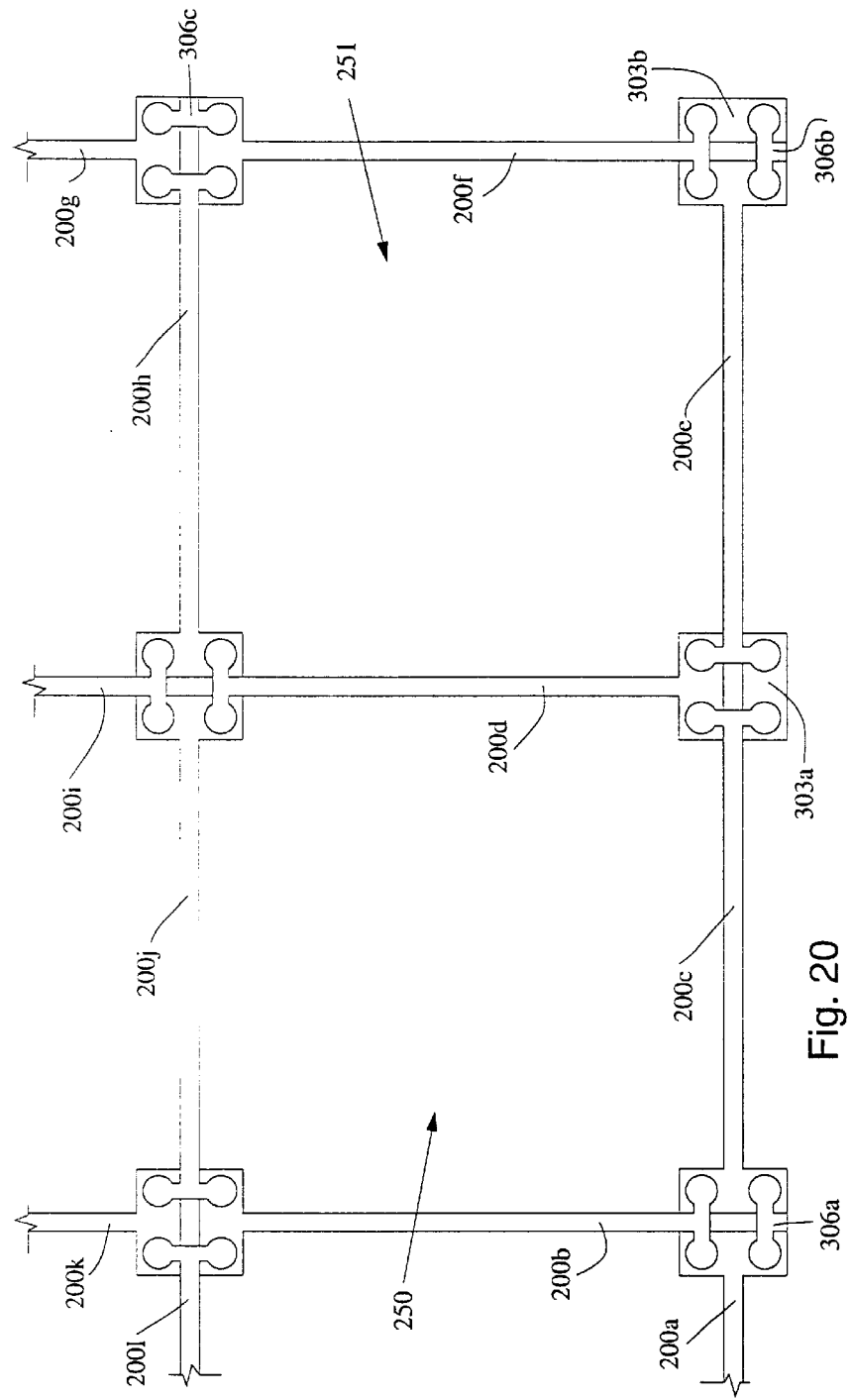

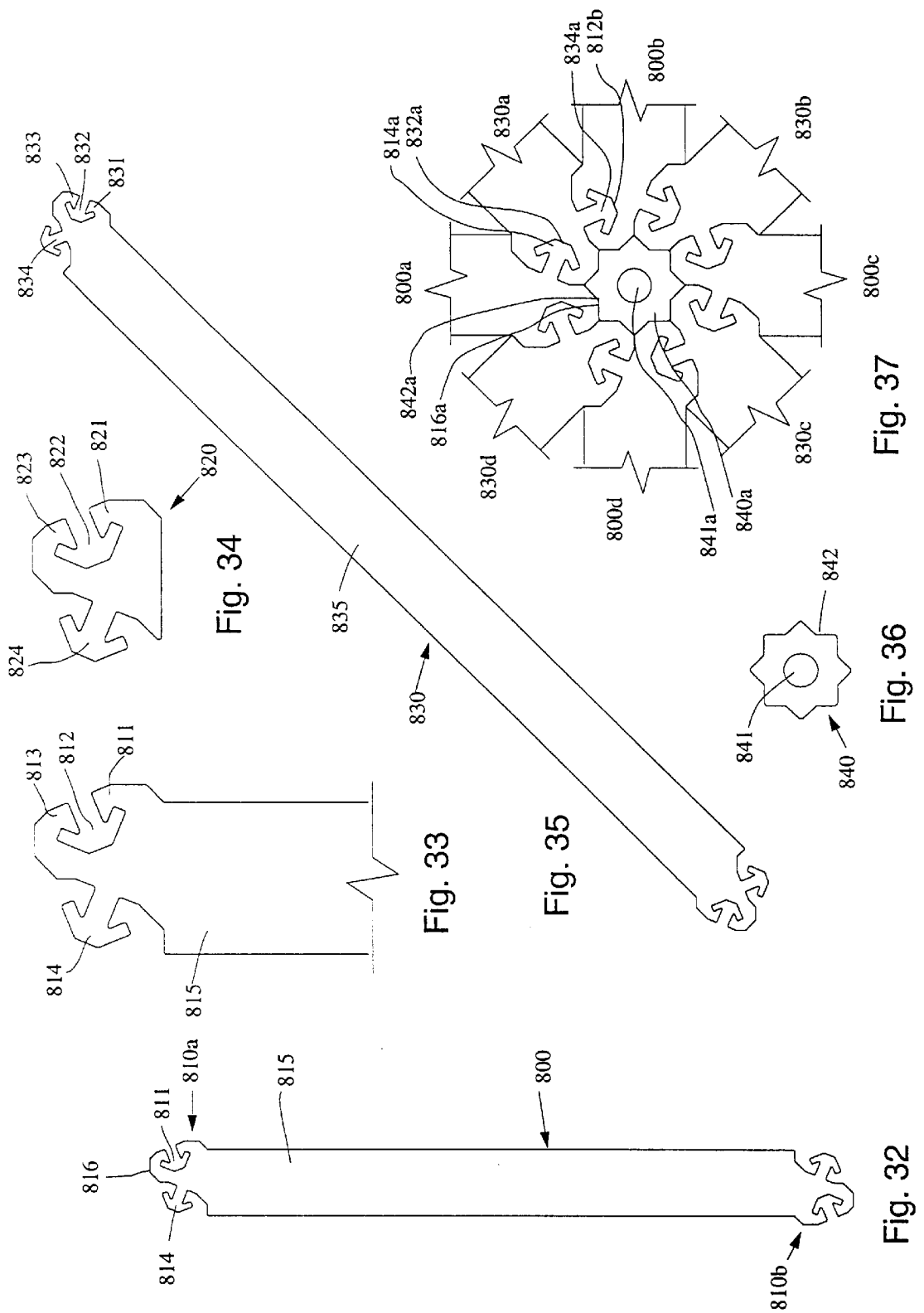

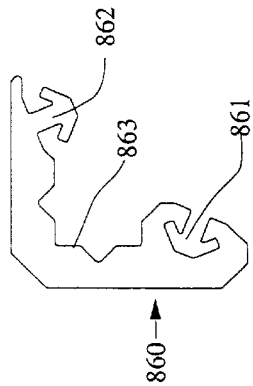
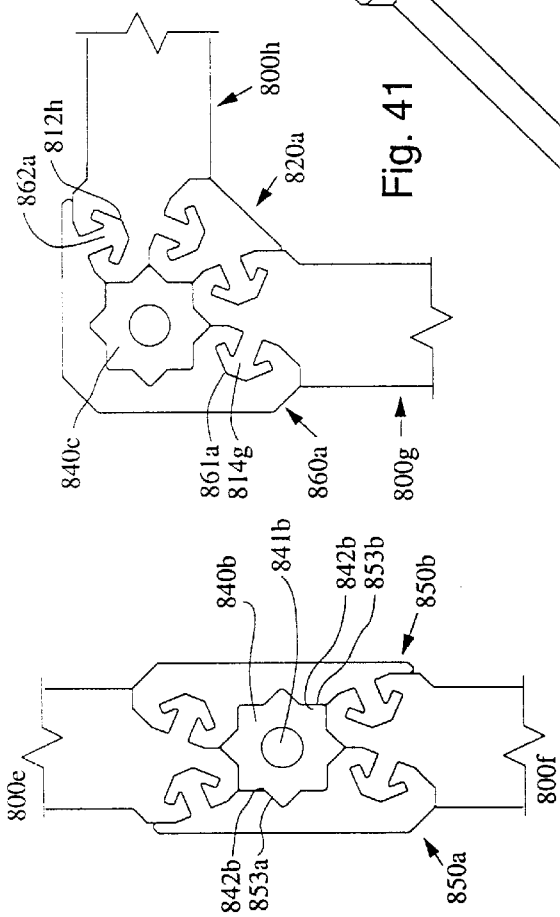
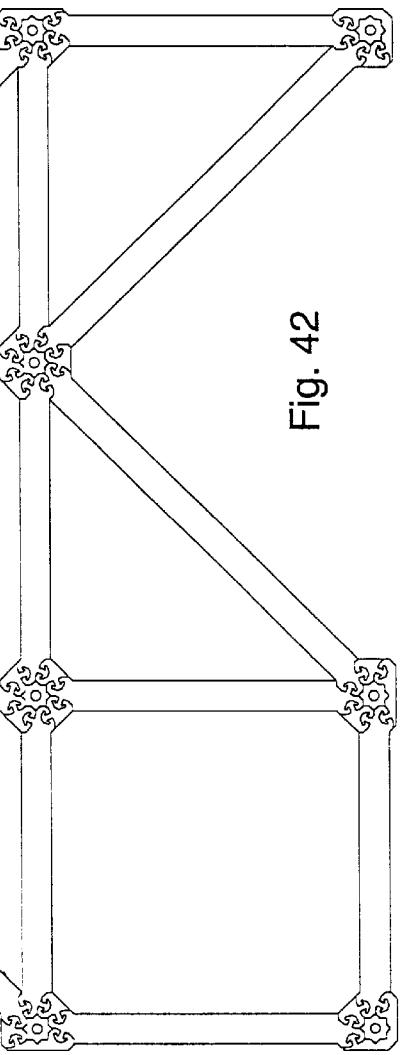
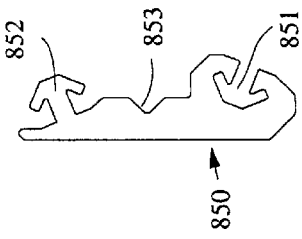

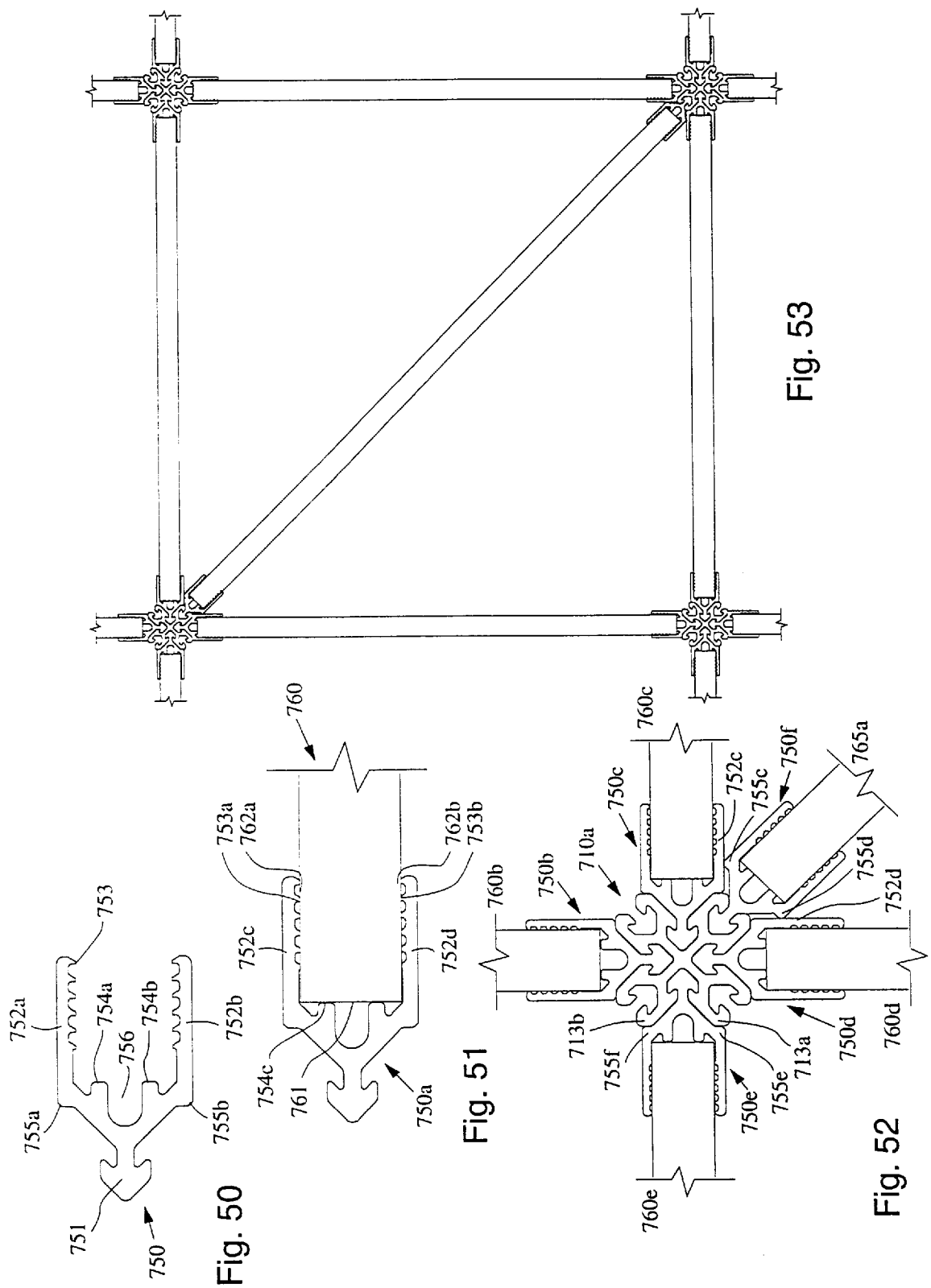

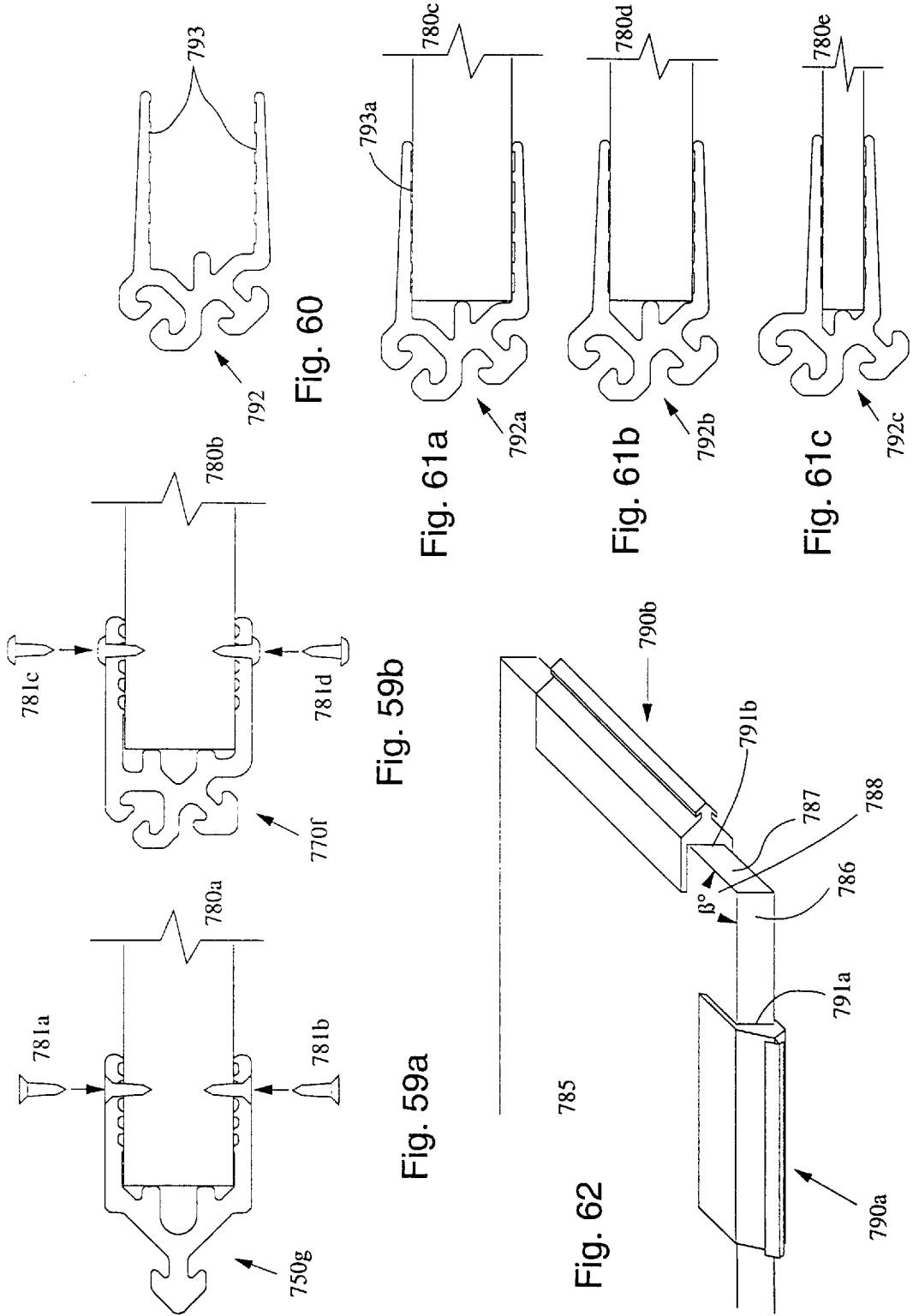

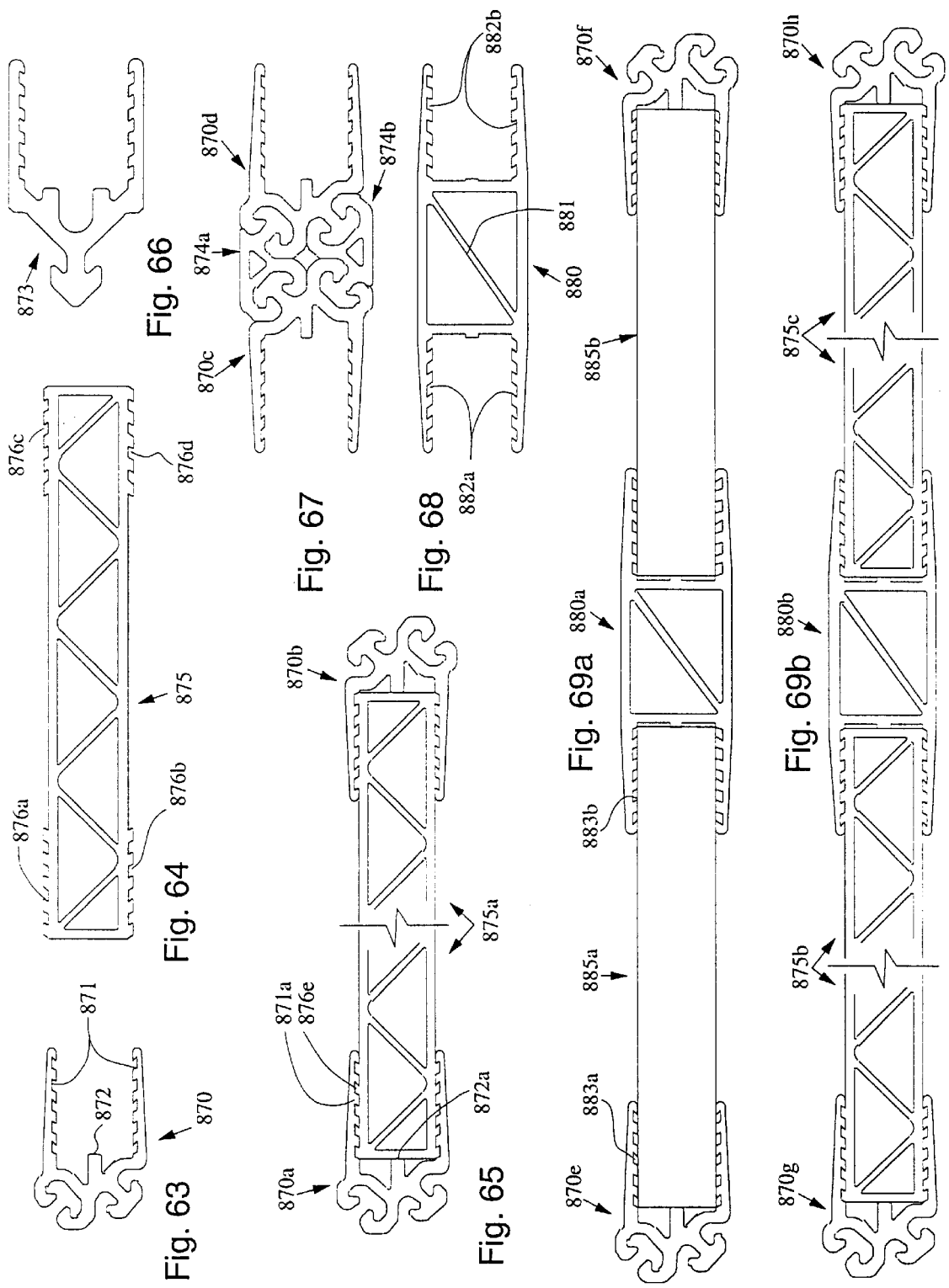

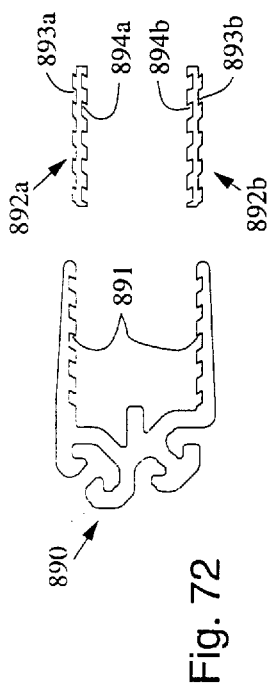
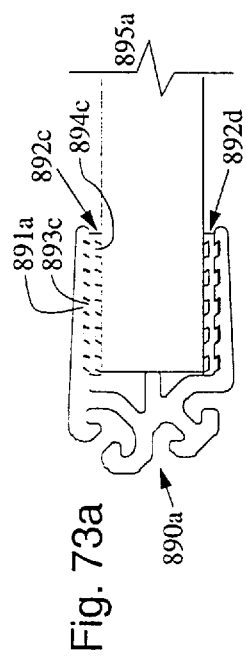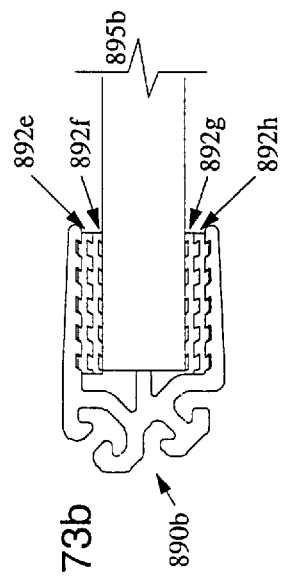
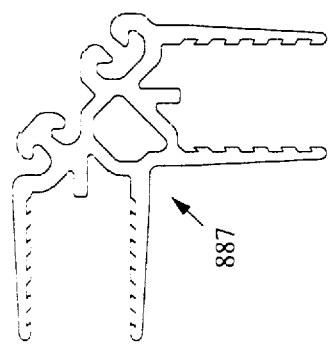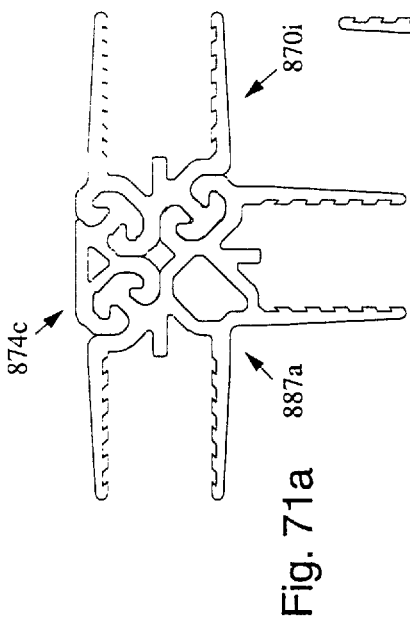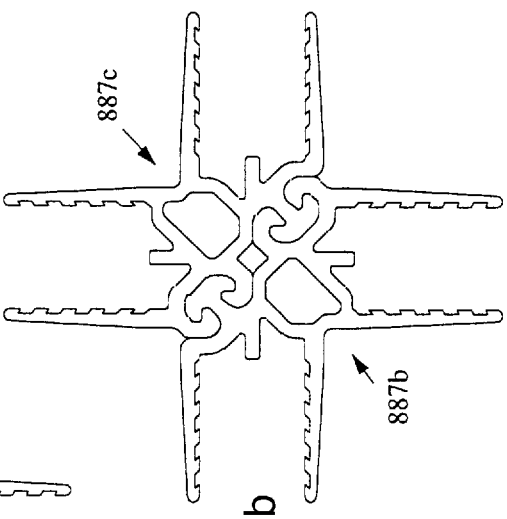

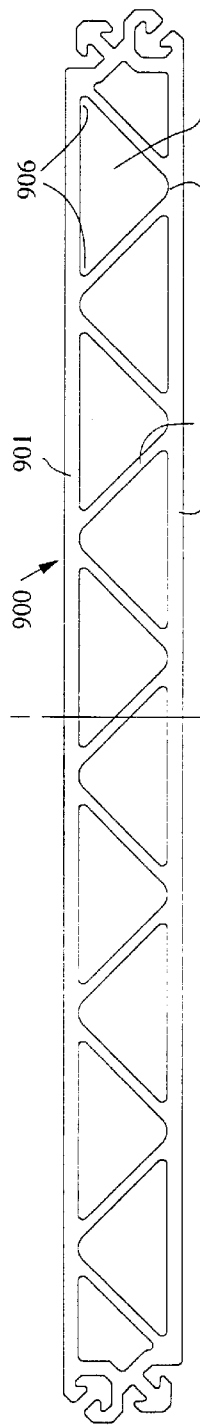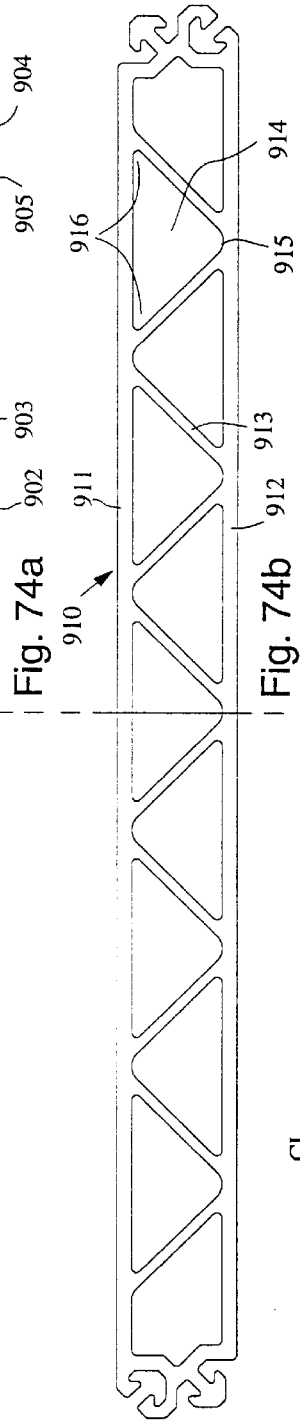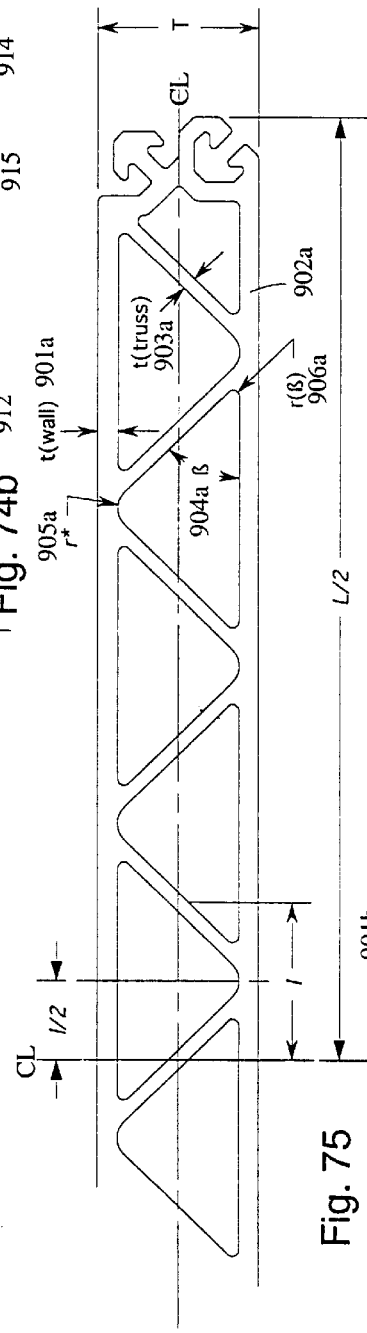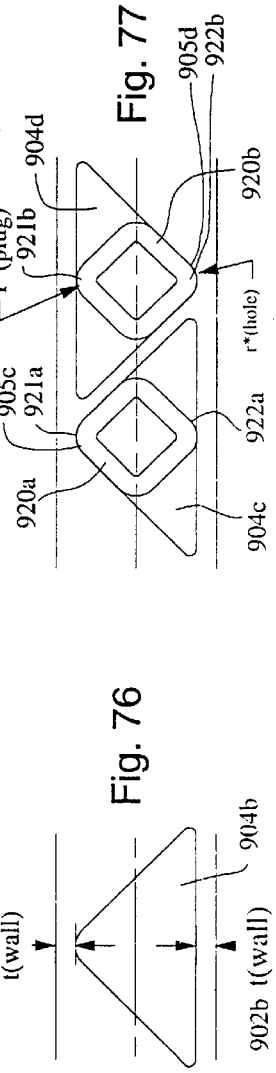

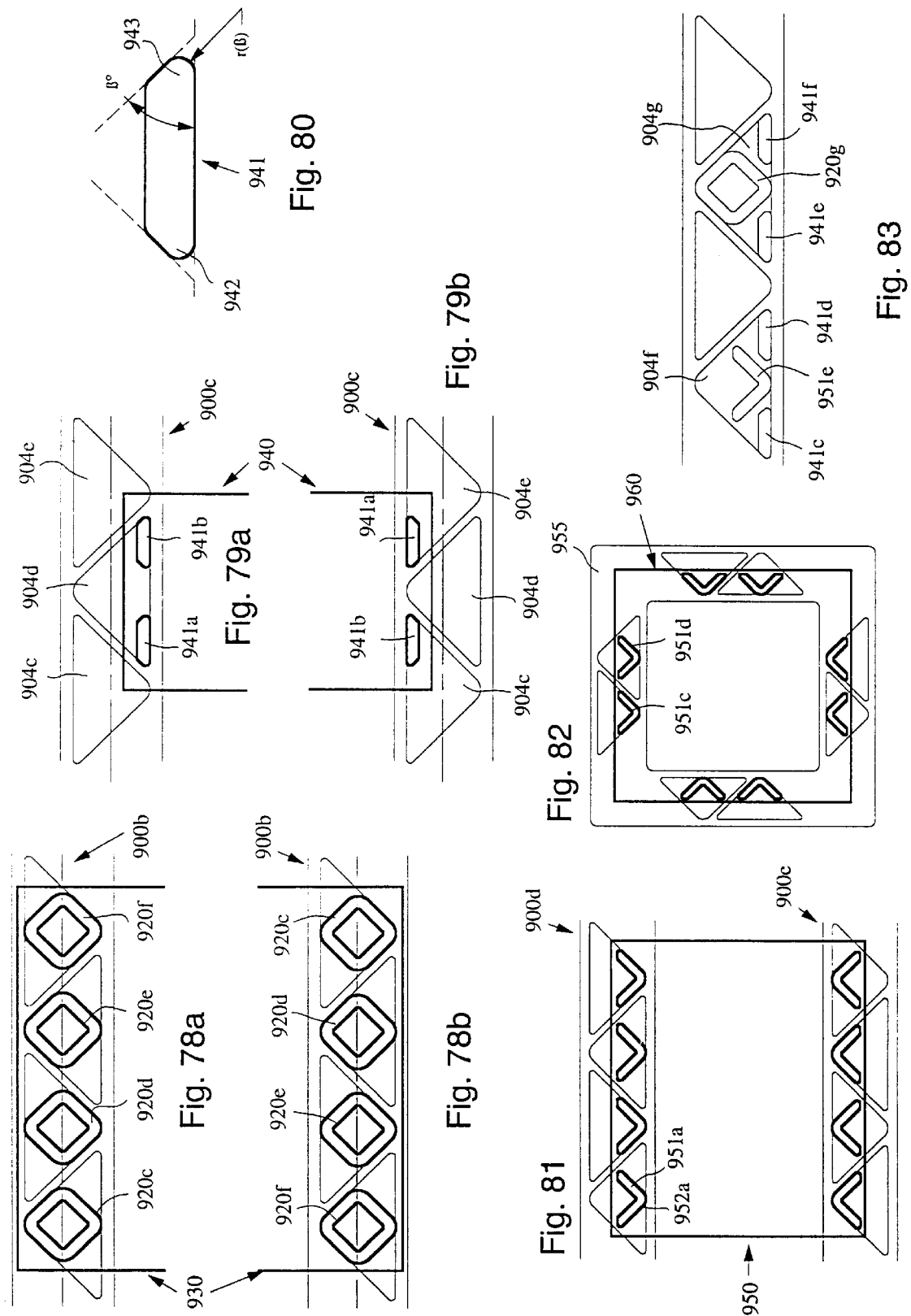

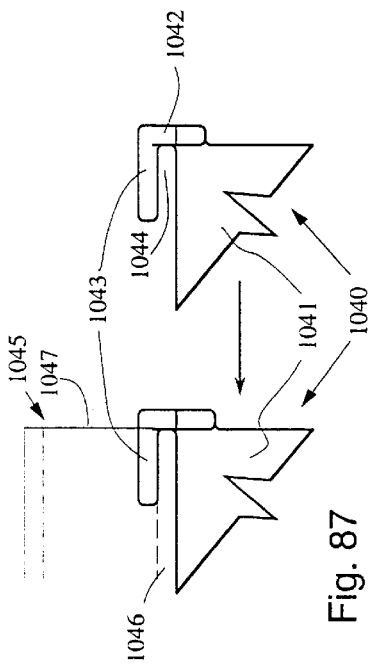
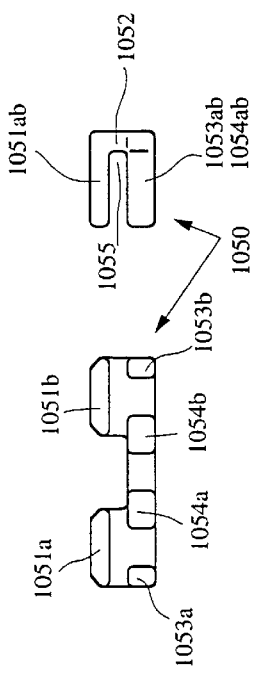
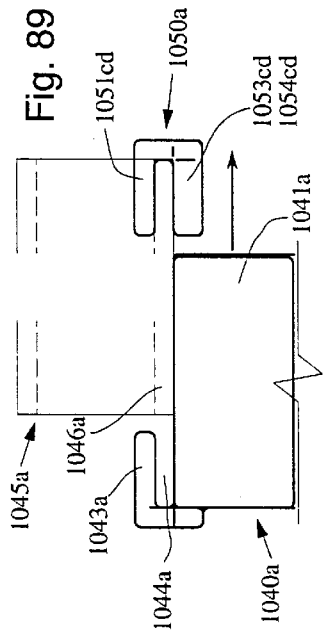
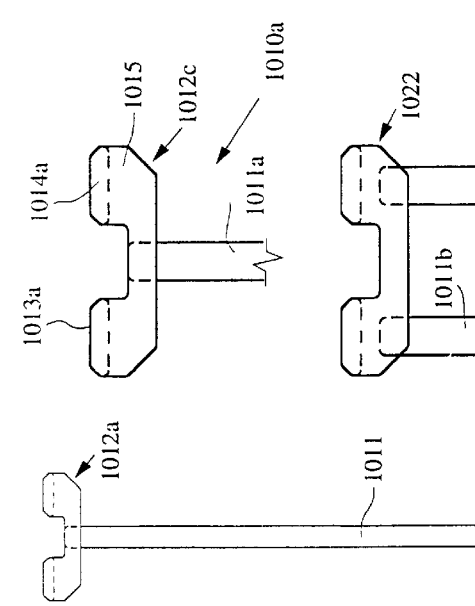
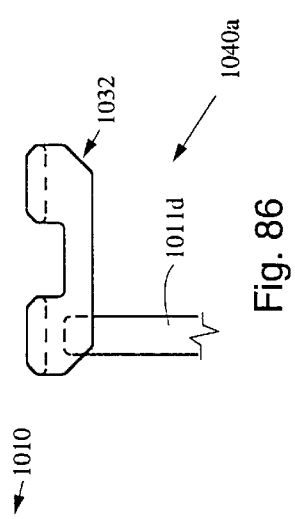

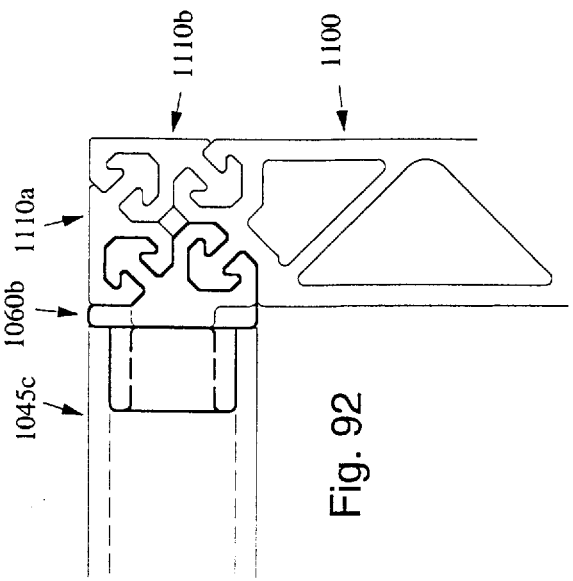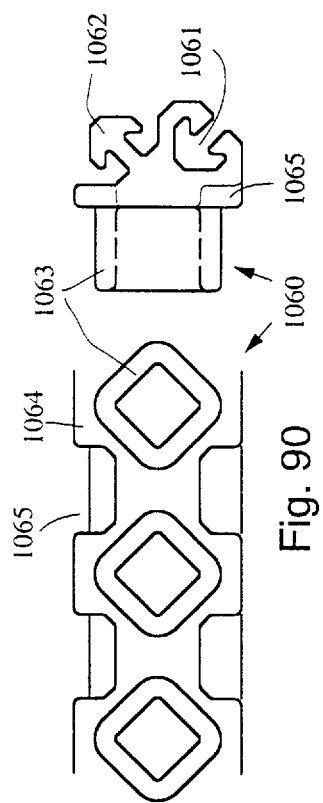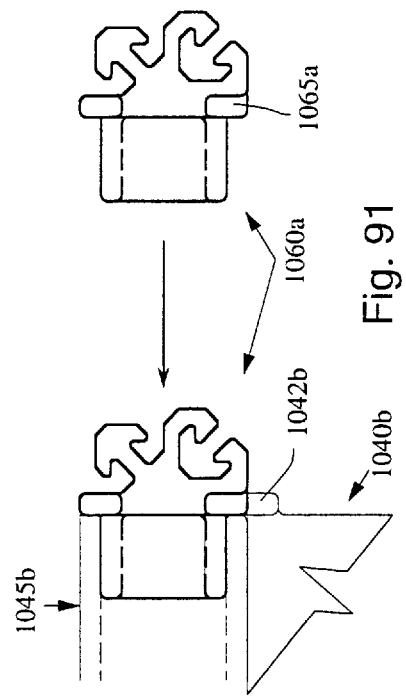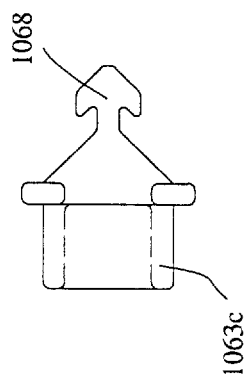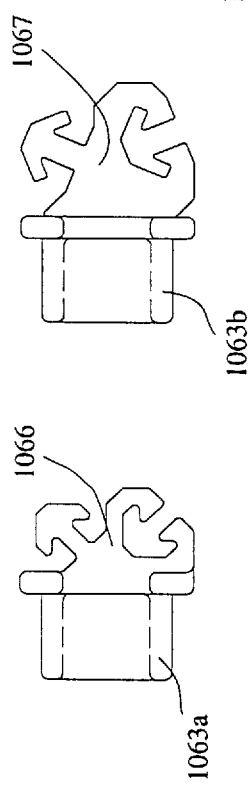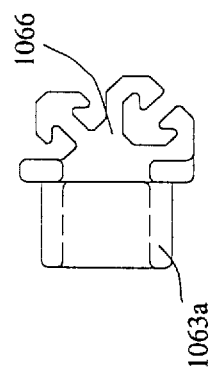

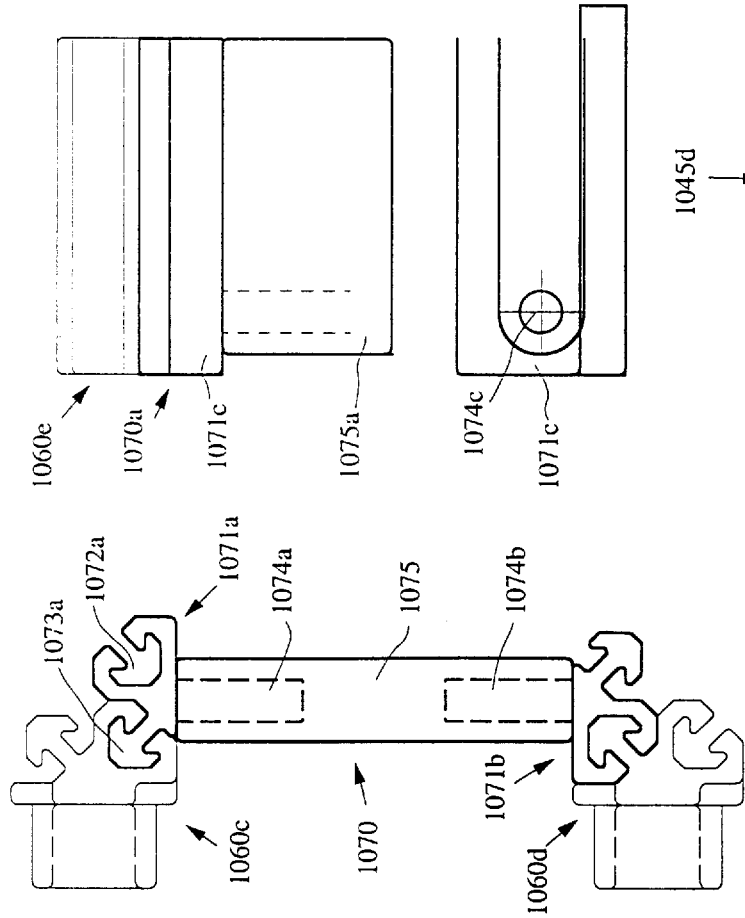
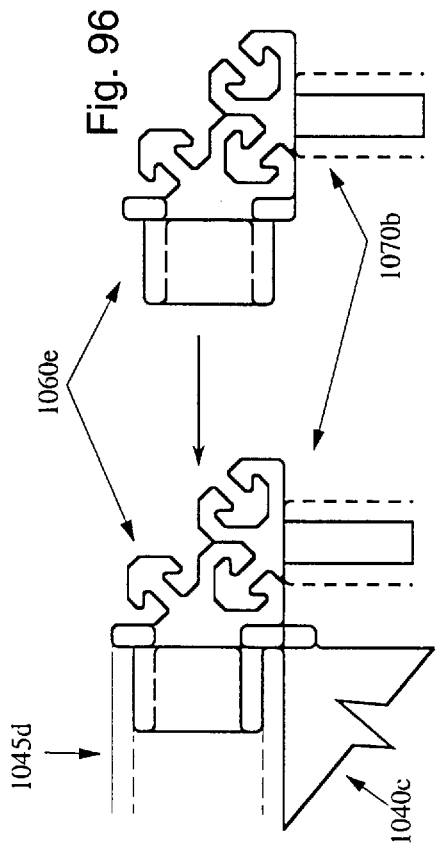

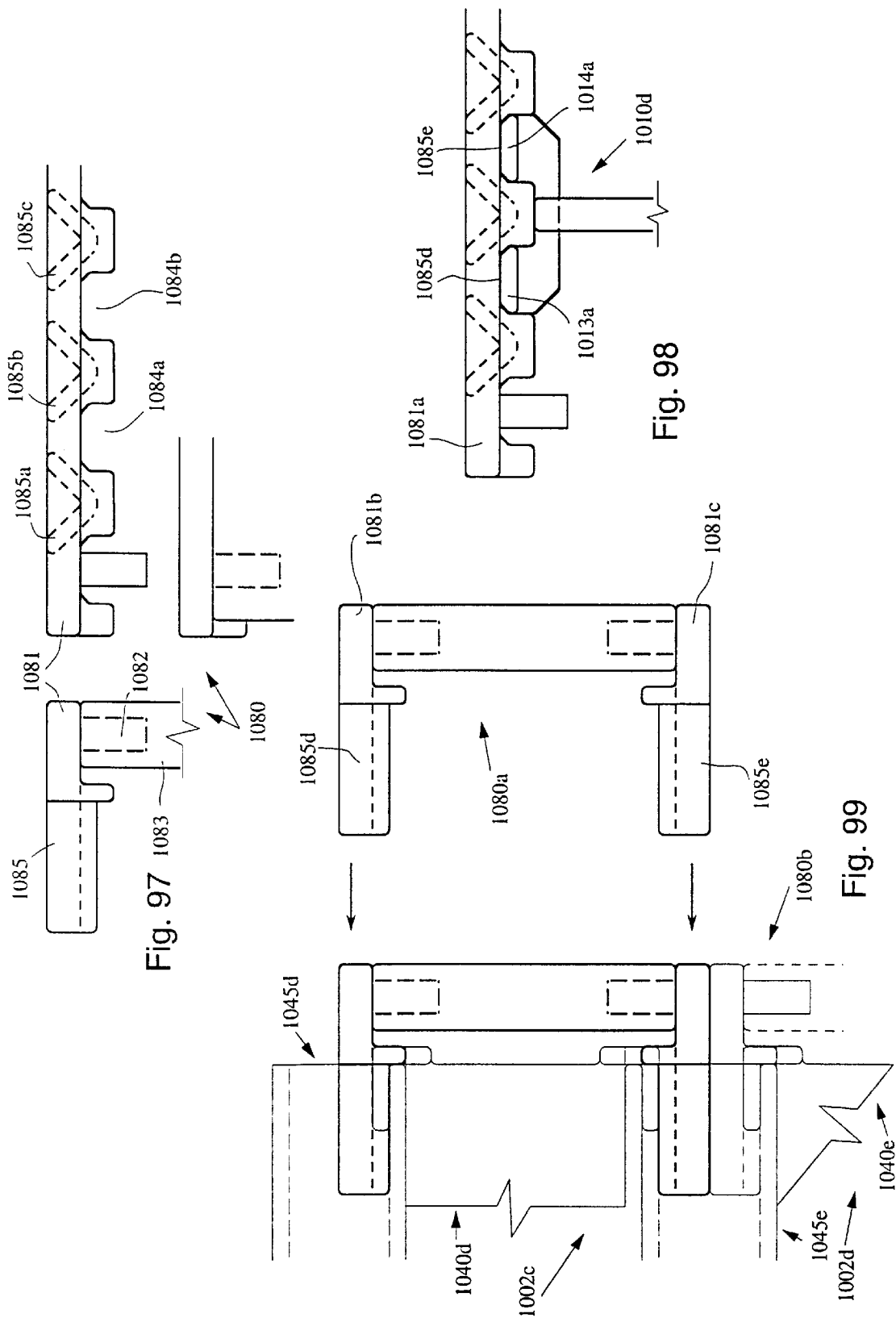

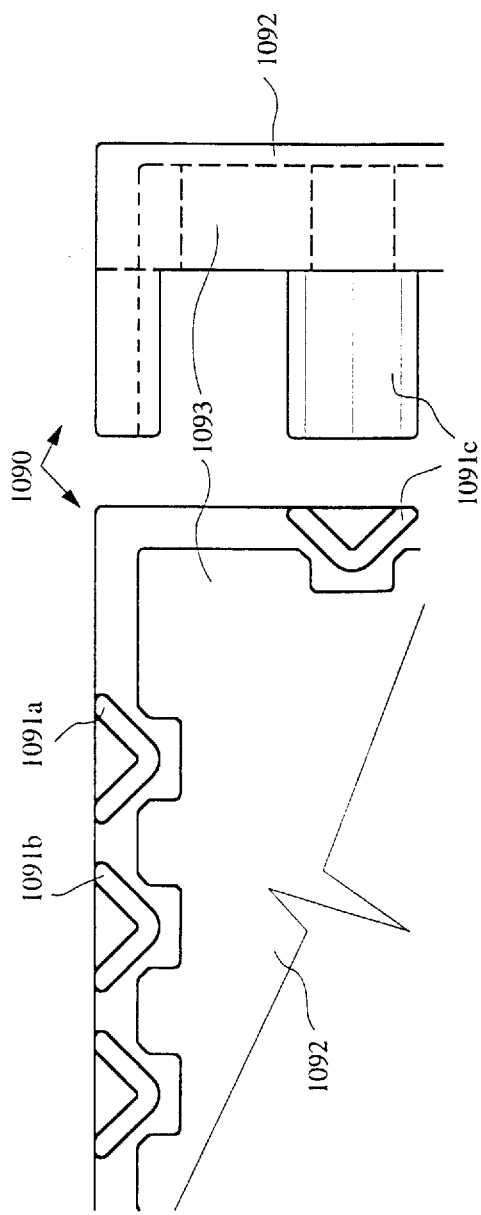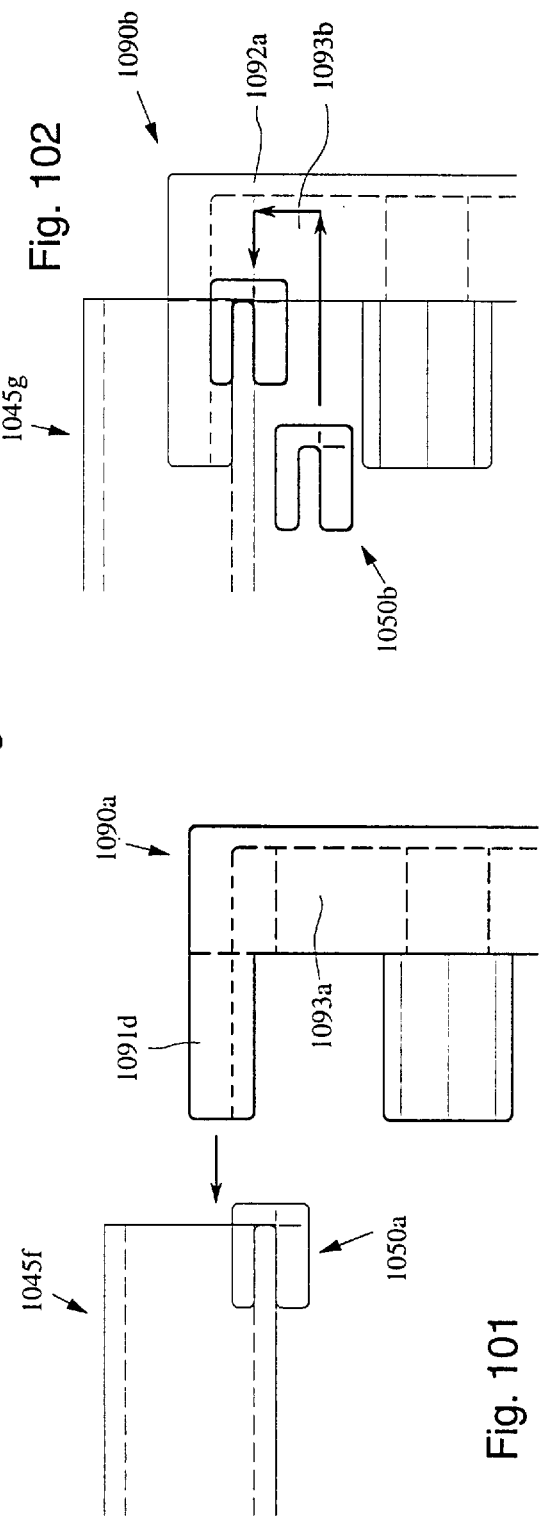

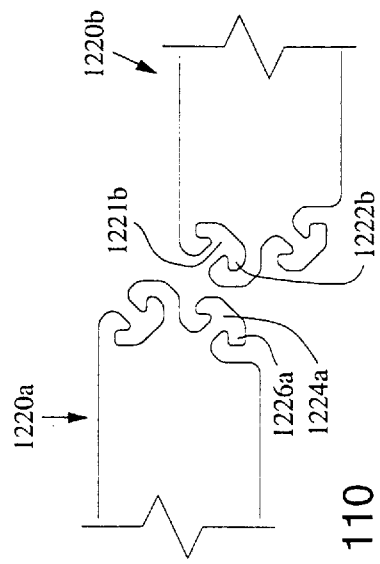
Fig. 106
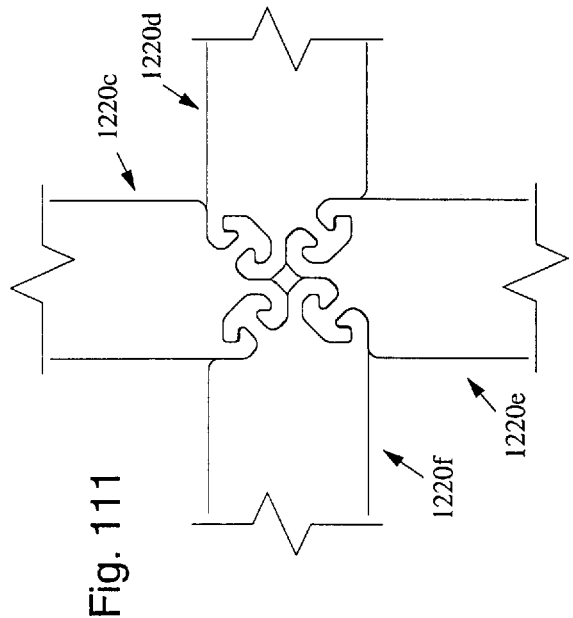
Fig. 110
Fig. 111
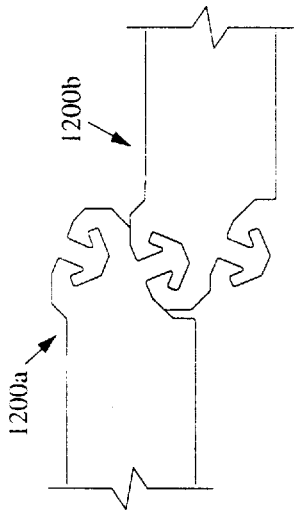
Fig. 107
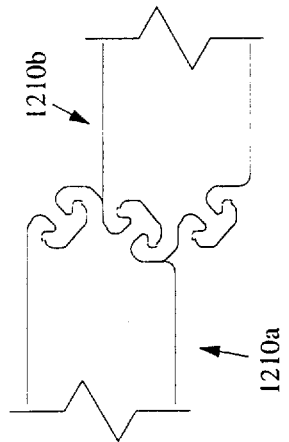
Fig. 108
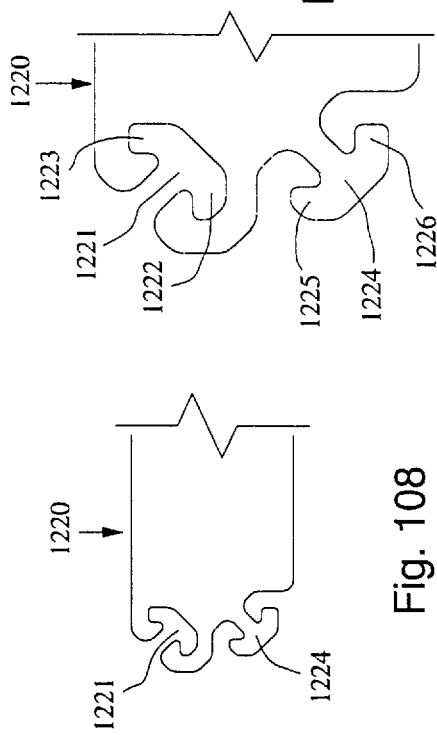
Fig. 109

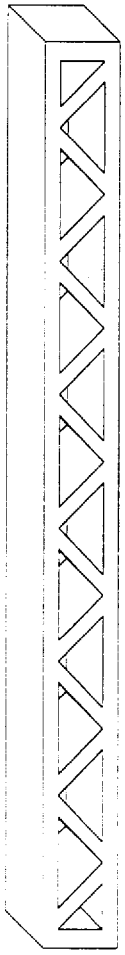
Fig. 112a
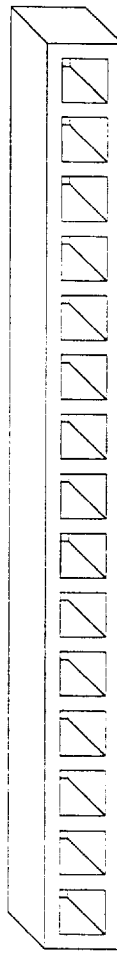
Fig. 112b
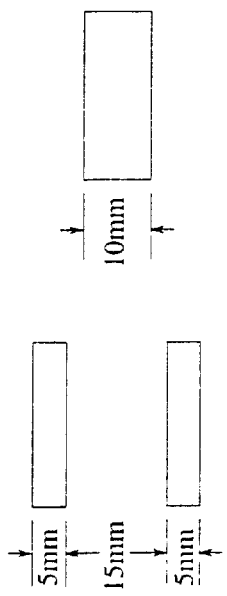
Fig. 113a
Fig. 113b
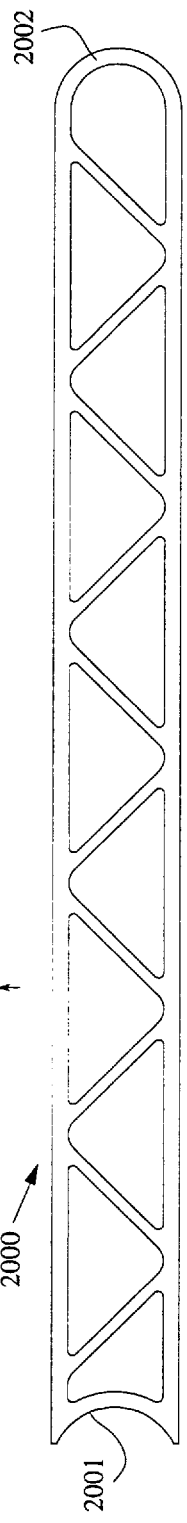
Fig. 114
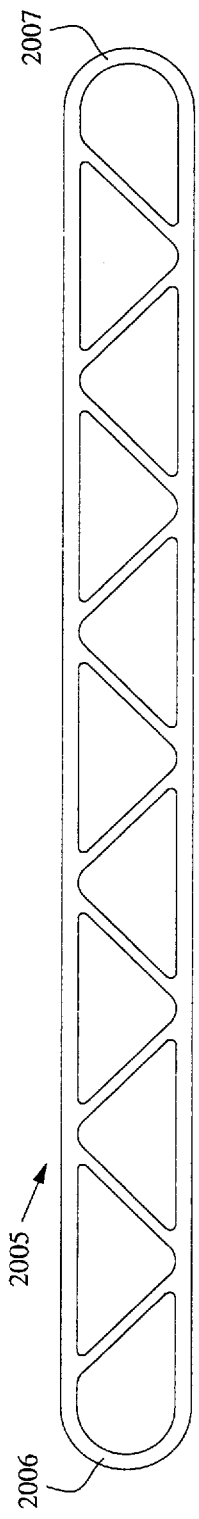
Fig. 115

MODULAR STORAGE SYSTEM, COMPONENTS, ACCESSORIES, AND APPLICATIONS TO STRUCTURAL SYSTEMS AND TOY CONSTRUCTION SETS AND THE LIKE

The present invention relates to modular interlocking construction structures, being more particularly directed to the creating of modular structures from plates and attaching components provided with end features that allow them to be joined together to form sturdy cubic-type and other structures, with the unit structures themselves being adapted to interlock to form arrays of cube-like and other structures that can be used as customizable modular systems for storage, shelter and other applications, including, also, toy construction sets and the like.

BACKGROUND

There are a great many different types of storage devices on the market embracing a variety of different techniques and designs for storage volumes, containers, shelving systems and the means for assembling them. There are also numerous types of construction sets, building blocks and interlocking accessories useful as toys. There are also varied designs for joining and attaching components and structures together for such storage systems, wall shelving, toys, and in the shelter fabrication and assembly industry, among others. The patent categories related to this invention have been identified as: collapsible crates, open-end boxes and containers; modular shelving, display racks, and storage devices; housing and building materials, larger structures, paneling and tiles; workspace management systems; toy construction sets and accessories; joints and interlocking features.

The category of crates and containers includes numerous prior inventions for desired ornamental appearances and for functions of stackable and often collapsible, knock-down, and foldable types of containers similar, for example, to the common milk crate and the like. U.S. Pat. Nos. D273,338; D273,523 through D273,526; D277,797 through D277,800; 4,619,371; and 4,911,303, as illustrations, show various designs of such single-piece stackable crates. Often these crate designs include small tabs or other features that align the crates when situated side-by-side or with one on top of another (typical vertical stacking). Actual use of these crates in non-vertical stacking situations, however, demonstrates that the crates are not well-connected to one another and are therefore susceptible to separation and disorganization. A collapsible container, moreover, is often desired for its more-compact shape when not being used to transport or store objects or materials. In U.S. Pat. No. 3,485,433, for example, the need for edge strength in a knockdown box is recognized and the structure accordingly includes a frame of stronger material in the fold-over wall panels of the container. In U.S. Pat. No. 3,613,931, the walls of the container are held together by simple grooves and connecting strips. These two concepts allow for the compact stacking of the wall panels when not in use; but when in use, however, the joints are not strong enough to resist shear loads and side loads that occur when the containers are oriented with the "top" opening disposed sideways. While improvements in these structural deficiencies have been addressed, they still exist in prior single-piece crates and containers, as well as in the more robust, often plastic and ribbed, designs of, for example, U.S. Pat. Nos. 3,485,433; 3,613,931; 4,044,910; 4,238,044; 4339047; 4,343,400; 4,789,075; 4,917,255; 4,923,079; 4,940,155; 4,964,349; 5,094,356; 5,398,834; and 5,398,835. Such prior collapsible container designs have numerous varied mating features; some even include springs and small parts that must be assembled into the container wall panels. These complicated features and numerous parts, however, add to the cost of the products without actually significantly improving structural quality when stacked with openings oriented sideways. The panels themselves, moreover, are different within each container set, with sides and bottoms being significantly different from one another, thereby increasing the number of components that must be manufactured, distributed, stored and inventoried. Also, when stacking these containers in arrays, container walls are redundant—neighboring container units can share common walls, but these designs do not provide a means of sharing walls in semi-permanent applications such as storage and object organization and similar useages.

In the field of modular shelving, display racks, and storage devices, there are three general classes of such devices: single-piece storage units that interlock; free-standing modular shelving-type designs; and shelving designs for wall-mounted assemblies.

The prior single-piece container type designs in this grouping include means for more rigid attachment to neighboring containers, as opposed to the alignment features of the crates of the previously-described section which provide alignment and very little resistance to dismounting. Systems of this type include the structures of, for example, U.S. Pat. Nos. 3,964,809; 3,999,818; 4,528,916; and 4,889,254. The design of U.S. Pat. No. 3,964,809 features a locking tab and pin component on the inside of one of the unit cabinet walls that interlocks with the component on another stacked cabinet unit. While this secures a plurality of container units together in a more rigid fashion, the additional locking elements to each cabinet unit raises part count and increases the cost of such units. U.S. Pat. No. 3,999,818 shows a storage module with interlocking dovetail projections and grooves that are integral to each unit and that allow slide-motion interlocking at any of the five walls of the module, the sixth side being open. These grooves and projections, however, are numerous and leave the outer walls of any unattached unit with a non-flat surface. The walls between attached units, moreover, are redundant. For applications where a storage configuration is not often changed, this redundancy costs the user some storage space and money. U.S. Pat. No. 4,889,254 is a similar design for interlocking boxes in which the unit boxes have dovetail features on the four sides so that a two-dimensional array of container units can be formed. In U.S. Pat. No. 5,195,642, as a further example, a display and storage rack is disclosed for cassettes and like shapes and that is comprised of single storage units that can be attached to other identical units to form a larger structure. The design of previously cited U.S. Pat. No. 4,528,916, as still another illustration, relates to the customization of safety deposit boxes, and provides a means of using a single, shared partition wall between adjacent safety deposit box volumes that can be removed only when the two doors of the adjacent boxes have been opened. The width of the boxes, however, is not changeable, nor can the array of boxes be modified to be larger or smaller than the outside frame structure, so that all modifications to the array must occur inside that given frame.

Prior art shelving and structure designs that are of the modular, free-standing types are also numerous. Examples are described in U.S. Pat. Nos. 3,964,810; 3,986,316; 4,934,858; 4,940,149; 4,940,150; 4,964,150; 5,158,187; involving separate shelf units and post units. By combining shelf units and the requisite number of post units, a customizable shelf structure of any integral dimensions can be obtained. In some of these designs, the shelf units are shared by adjacent storage volumes, and in some designs, the post units are also shared by adjacent shelf units. Thus, these structures are more efficient in terms of element usage as they do not result in redundant members. Such designs either involve additional parts, like the several parts that make up a post unit in U.S. Pat. No. 3,986,316 or the multiple components of the shelf unit of U.S. Pat. No. 4,964,350, for example, or the attachment between the posts and shelf units are susceptible to separation by side, shear or upward forces. Another approach is provided in U.S. Pat. No. 5,185,982, using a corner joint of vertical and horizontal rail members of a modular assembly of an open frame. But such a design does not allow change in array size of a given frame without replacing original rail members with longer or shorter rail members, resulting in several unused original members, which is deemed undesirable and wasteful.

Previously proposed wall-mounted shelving designs are also numerous and extensive. U.S. Pat. No. 3,965,826 is an example of prior wall-mounted shelving comprised of rails that are mounted to a wall, cantilever brackets that fit into the rails, and shelf elements that are placed on the brackets. While this type of shelving is popular and widely used, it requires the mounting of rails to walls, which does not allow for simple removal or lateral relocation of the shelving. For those users who do not have the skills or tools safely to mount the brackets to the wall, moreover, this design is not desirable. These wall-mounted designs, furthermore, do not provide for integrated divisions along a shelf, so additional bookends and the like must be used. Such a wall-mounted system is also often difficult to make aesthetically attractive in its setting, since the rails and brackets are quite visible.

Turning now to the art embracing modular housing and building materials, large structures and paneling, the construction industry often uses modular materials that allow for the construction of structures involving joined modular components such as wall elements, tiles and panels. For example, U.S. Pat. No. 3,942,290 discloses interlocking connectors to attach structural components together. This connector features a multiple dovetail cross-section that slides into the attaching structural unit along the edge of that unit and thus prevents detachment in the orthogonal direction. As will later be more fully explained, for the purposes of the present invention such multiple dovetail joint configurations are not well suited to connect multiple components at a single joint since the multiple dovetail features make the connector rather large at each joint. U.S. Pat. No. 3,958,388 also shows the use of a dovetail clamp to connect adjacent construction members, but in this use, where elements are pushed together to mate, adequate pulling forces in the opposite direction or twisting can cause the joint to fail. When the dovetail joint is used in a sliding fashion, as is disclosed in U.S. Pat. Nos. 3,942,290; 4,884,378; and 4,688,362, for example, and as is typically done in woodworking joints, an assembled structure has stronger joints; but when using a plastic or rubbery material that can undergo elastic or plastic deformation, a dovetail protrusion can pull out of the dovetail groove. As still a further approach, U.S. Pat. No. 4,688,362 discloses a basic set of modules that can form end-to-end, T-, L- or cross-joints without using end-to-end, T-, L- or cross-connectors. The end features have dovetail or like coupling-shaped protrusions and grooves in such a fashion that the elements of the basic set of modular parts can form walls without additional connectors or parts. U.S. Pat. Nos. 4,817,356 and 4,922,678 are further illustrations that describe prior sets of structural elements having mating features to assemble the structures.

U.S. Pat. Nos. 3,932,976 and 5,074,093 are exemplary of prior techniques involving interlocking tiles and panels. The joints disclosed in the patents, however, are meant for low-load applications and are thus not well-suited for the hereinafter described applications of the present invention.

In still another field, that of workspace management systems, the organization of the workplace often involves the separation of space into personal or smaller workspaces. Illustrative approaches to suitable structures are shown in U.S. Pat. Nos. 5,038,534; 5,038,539 and 5,394,658, all disclosing designs describing the numerous modules and pieces involved in assembling customizable workspace management systems. The joints between modules, however, do not scale well for the later-described applications intended by the present invention; on the other hand, the present invention discloses designs of joints that can well be applied to the workspace management system designs.

Discussing, now, the field of toy construction sets and accessories, there exist on the market many popular and successful toy construction sets which comprise building blocks, attaching elements and joints in many variations. These include, for example, the current designs known as LEGO®, Duplo®, and K'Nex™. U.S. Pat. Nos. 3,005,282; 3,162,973; 3,597,875; 4,571,200; 4,585,422; 4,895,548; 5,061,219; 5,137,486 and 5,350,331 describe some of the designs for elements of these and other toy systems. In each of these designs, the assembly of interlocking pieces is made simple enough for children to assemble, while providing adequate structural properties to withstand loads and forces typical of the playing environment. For larger loads and twisting forces, however, the joints may not be adequate.

There also exist a great number of accessories for such play sets. Examples are shown in U.S. Pat. No. 4,822,314 involving a container on which construction blocks may be attached and in which the same blocks may be stored. Similarly, U.S. Pat. No. 5,250,000 discloses a play kit with a detachable play surface, a carrying case with a playing surface on which building blocks may be attached and in which the blocks may be stored. In U.S. Pat. No. 4,926,758, a play tray with hinged legs is provided. In each of these accessory designs, the case or container serves a second purpose in addition to its play value. These designs, however, do not lend themselves to the building of larger-scale structural arrays with play and storage value by elements that are themselves modular building entities.

In addition to the joining techniques and interlocking features disclosed in the patents discussed above, there are many other prior joint designs that have proposed, such as those disclosed, for example, in U.S. Pat. Nos. 3,991,535; 4,233,878; 4,542,702; 4,545,698; 4,629,161; 4,820,077; 4,825,529; 4,962,805; 5,018,628; 5,137,239; 5,397,087; 5,399,043; 5,399,044; 5,433,053; and 5,439,309.

Despite all these varied approaches over the years in the many fields above-described, there still remains the need and the desire for providing improved modular elements, components and accessories for economical, attractive, practical and simple customizable modular storage systems, and also for toy sets, workspace management systems, and housing and building applications, by employing novel and robust designs that are easy to make and assemble and that eliminate the various disadvantages of prior art techniques as before described.

Even in the light of all the designs that have been previously developed, indeed, the most popular and widely-used design for modular storage is still that of the common "milk crate", or a formed cubicle storage container. This is due to the fact that it is inexpensive and widely available; however, it is also unstable when stacked with open ends horizontal for loading with objects unless one takes the time to bolt or affix the crates together. In the end, however, they still look like milk crates, and they are bulky to ship, and they take up a large amount of shelf space in stores and inventories. The wall thickness, moreover, is not sufficient to support substantial loads such as books. Furthermore, because they must sell for little money to attract buyers, the return on investment for a retailer with limited shelf space or stockroom space is very low. If, indeed, one needs to assemble an array of 20 milk crates in a home or office to form a wall unit this is most awkward.

This has led to the development of the present invention that, in one application, provides what might be characterized as "take-apart milk crates". Such novel and structurally-sound design of modular storage units and accessories also leads to greater applications of these storage systems, with the designs, detailed features, and means of assembly readily scaleable for other applications as well, such as workspace management systems, modular housing construction, and toy construction systems among others.

OBJECTS OF INVENTION

An object of this invention, accordingly, is to provide new and improved designs for modular elements that can be easily assembled to form aesthetic, strong, and functional storage cubes and that can themselves be assembled into an array of storage cubes for storage of odds and ends, clothes, books, and other "cubby" functions, and the like, and without the previously described limitations and disadvantages of prior structures.

A further object of the invention is to provide a novel design for attainment of the primary objective through the use of the LEGO®-type concept that makes the four sides of the cube from plates formed with studs and mating sockets, so the cubes can also serve as building units to allow the storage function to be combined with play value.

Another object is to provide an improved design for attainment of the primary objective through the use of a simple cross-section that can form an interlocking joint of very high strength that essentially enables one to form a rigid cube from simple extruded plastic or metal plate-type shapes with special interlocking ends.

An additional object of this invention is to provide supplemental designs for the interlocking extrudable geometries that allow for add-on accessories, such as drawers, dividers, doors, and paneling, and the like, to the storage structures to provide multi-axis functions and customizable modular systems in addition to the original storage utility.

A further object of this invention is to provide designs of structures and joints that are also useful in both smaller and larger applications, ranging from small-object containment and toy building block systems, to human workspace management and shelter fabrication and the like.

SUMMARY

In summary, the invention, from one of its broader aspects, embraces structural components for assembly into interlocking modular cube-type structures, in turn, interlockable with other similar cube-type structures to form horizontal and/or vertical arrays of cubes, the components having, in combination, substantially planar plates each having movable male protrusions and female openings for receiving the same and disposed in plate end surfaces having at least portions extending at an angle to the plane of the plates.

More particularly, the invention is concerned with the formation of modular units from individual plate-like elements and other elements with special interlocking joints at their ends that allow them to form cubes that can be grouped together to form storage "cubbies" and modular structural systems.

In a first embodiment, the plates are formed, for example, by injection molding to have LEGO®-type male protrusions (studs) and female openings (sockets) whereby one type of plate has studs on the inside surface and sockets on the outside surface and one end with studs on a 45 degree angled surface, and the other end has sockets on a 45 degree angled surface, and a second mating plate like the first where the studs and sockets are interchanged. This allows a cube to be formed by two of each type of plate; and the use of studs and sockets on the surfaces allows two or more such cubes to stick together, because the studs mate with the sockets, and can also form connections with flat LEGO®-type plates with studs and sockets.

In a second embodiment, the cube is made from four identical plates, preferably made from an extrusion process, where one end of a plate contains double male elements or features, such as substantially circles or arrows or similar shapes, and the other end contains double female elements or features that mate with the male features from other plates, whereby the male and female features allow the ends of the plates to slide into each other like a dovetail to form a cube. Adjoining cubes therefore share surfaces, such that to add a cube to an existing array would take at most three more plates.

In a third embodiment, the cube is made from four identical plates as in the second embodiment, but where the ends of the plates are axisymmetric, each end having one male and one female feature, oriented such that a rotation of 180 degrees results in the identical configuration. These plates are also preferably made with an extrusion process, and the plate ends are also slid into each other along the axis of the joint. Adjoining cubes, and also structures with angles other than 90 degrees between plate members, share surfaces.

A fourth embodiment involves a cube plate design where the plate elements have symmetric single male or female features, and a center joint piece with the opposite gender feature. Each cube array joint consists of one core piece, and the walls of the cube array consist of the plate elements. Adjoining cubes share these plate surfaces as well.

A fifth set of embodiments involves the decoupling of the wall component and the end feature components. A user of the elements can customize the modular system by choosing the desired type, material and size of wall element and then combining it with the end joining elements using any of the joint designs of previous embodiments. The cube array is then equivalent to the embodiments described, but allows more user-customization.

A sixth embodiment is a wall truss design which maintains the characteristics of the modular storage concepts above but which also adds functionality to the storage system or structural system with the accessories that can be added to systems by engaging with the specially designed truss cross-section, or useful as extruded truss structures alone.

In each of the above second through sixth embodiments, when the mating features are configured as a barbed protrusion and a barbed socket, the interlocking of the barb and the socket provides substantially increased strength over non-barbed features.

Further embodiments illustrate types of accessories that can be added to storage or structural systems employing the plate embodiment design and the wall truss designs.

Other embodiments describe tools for material customization and installation, and such as preferred and best mode embodiments are hereinafter more fully described.

DESCRIPTION OF THE DRAWINGS

The invention will now be described with reference to the accompanying drawings in which:

FIG. 1 shows a prior art conventional LEGO®-type plate element with studs on one side and the mating socketed surface on the other side;

FIG. 2 shows a plate element designed in accordance with the invention with 45 degree inclined ends and where one end has studs on the inside surface and sockets on the outside surface and the other end has the opposite, and the broad width of the plate has studs on one side and sockets on the other side;

FIG. 3 shows a plate element like that of FIG. 2, but the positions of studs and sockets are reversed;

FIG. 4 shows a cube made from the interlocking plates of FIG. 2 and FIG. 3;

FIG. 5 shows the detail of the joint formed by the plates in FIG. 4, and the use of a plate element from FIG. 1 used to connect two cubes together;

FIG. 6 shows an array of cubes put together to form a bank of "cubbies" for storage;

FIG. 7 shows a stud and socket plate element like that of FIG. 2, but with a different type of 45 degree end that is simpler to form, though not as strong;

FIG. 8 shows the mating plate element to the plate element of FIG. 7;

FIG. 9 shows a cube formed by the plate elements of FIG. 7 and FIG. 8;

FIG. 10 shows a plate element like that of FIG. 7 but with an additional stud and socket orthogonal to the end studs and sockets;

FIG. 11 shows the mating plate element to that of FIG. 10;

FIG. 12 shows a cube formed by elements of FIGS. 10 and 11 and two-stud and two-socket plate elements currently available from the Lego Company;

FIG. 13 shows a structure of two "cubbies" formed by the set of elements of FIG. 12;

FIG. 14 shows a stud and socket plate element like that of FIG. 2, but with two-pronged ends with the prongs diverging at +and −45 degrees to the plane of the plate, that enable an array of cubes to be formed that share walls to reduce cost;

FIG. 15 shows the mating plate to that of FIG. 14;

FIG. 16 shows an array of cubes with shared interior plates and exterior plates formed by the plates elements of FIG. 14 and 15, and FIGS. 2 and 3 respectively;

FIG. 17 shows an extruded plate element with two round male dumbbell-like prongs on one end and a double mating pairs of round female receptacles on the other end, such that four of these identical elements form a sturdy cube;

FIG. 18 shows an extruded female end cap;

FIG. 19 shows an extruded male end cap;

FIG. 20 shows an array of cubes formed from the elements of FIGS. 17, 18 and 19;

FIG. 32 shows another asymmetric element like that of FIG. 27 but with different barb and barb mate angles that allow for 45° angles between joining elements;

FIG. 33 shows a close-up of the end of the axisymmetric element of FIG. 32 featuring the same basic features as that of FIG. 27;

FIG. 34 shows a terminating element that is the same as the wall element of FIG. 32 but without the wall plate component;

FIG. 35 shows a longer version of the axisymmetric element of FIG. 32 that may be used to connect joints having 45° between joint elements;

FIG. 36 shows a central core element with a through hole at its center to be used to increase the joint strength of a 45° axisymmetric structure;

FIG. 37 shows a close-up of a joint comprising of the axisymmetric elements of FIGS. 32 and 35 and a core center piece of FIG. 36;

FIG. 38 shows a side piece equivalent to three consecutively joined terminator pieces of FIG. 34;

FIG. 39 shows how two side pieces and a core element can join two axisymmetric elements at a 180° angle;

FIG. 40 shows a corner piece equivalent to five connected terminator end pieces;

FIG. 41 shows how a corner piece can be combined with the elements of FIGS. 32, 34 and 36 to form a sturdy corner joint;

FIG. 42 shows a structure of 45° element joints using the components illustrated in FIGS. 32, 34, 35, 36, 38 and 40;

FIG. 50 shows an end clip having the barb features of that of FIG. 45 and a toothed jaw replacing the wall component to allow for the attachment of a separate wall or board component element;

FIG. 51 shows the end clip engaged with a wall component element, with the jaw teeth embedded into the wall surface to provide a stronger gripping and attaching strength;

FIG. 52 shows a joint made up of the end clips of FIG. 50 with attached wall component elements in the clip jaws;

FIG. 53 shows a portion of a structure made up of the elements of FIGS. 44 and 50 with wall components attached;

FIG. 58b shows a different structure using the same elements as used in FIG. 58a;

FIG. 59a shows how flat-head screws can be added to an end clip into a wall component to provide even more attachment strength;

FIG. 59b shows how non-flathead screws having a flat head underside, such as panhead or roundhead screws, can also more permanently attach an end clip to a wall component element;

FIG. 60 shows an end clip with less-protrusive teeth of the jaw to provide more surface area and alignment for an inserted wall component element, which would be desirable when using adhesives to mate the clip to the wall;

FIGS. 61a,b,c shows how the joint end of the clip can be kept the same while the jaw gap can be made in varying sizes to accommodate wall components of different thicknesses;

FIG. 62 shows how end clips can be attached to any edge of a wall component with any angle between possible attachment edges;

FIG. 63 shows another variation of jaw features in an end clip, with this clip having non-protruding barbs to maintain a constant open gap in the jaw;

FIG. 64 shows a trussed wall element having mating barb features that would interface with the end clip barbed jaw of FIG. 63;

FIG. 65 shows how a barbed truss wall of FIG. 64 mates with end clip of FIG. 63;

FIG. 66 shows how a different end configuration can be used in the non-protruding barbed jaw end clip;

FIG. 67 shows a completed extension joint made up of end clips of FIG. 63 and terminator end elements like that of FIG. 29;

FIG. 68 shows a single connection piece that is equivalent to the joint group of FIG. 67 but stronger because it is one piece;

FIG. 69a shows a longer wall construction made of wall components in end clip elements and connection elements of FIGS. 63 and 68;

FIG. 69b shows how the elements of FIGS. 63, 64 and 68 can form a stronger wall extension structure;

FIG. 70 shows a corner joint element equivalent to two interlocked end clips of FIG. 63;

FIGS. 71a,b shows a T-joint and a cross-joint using the corner element of FIG. 70;

FIG. 72 shows a wider end clip like that of FIG. 63 alongside two thickness adapters;

FIGS. 73a,b shows how the thickness adapters of FIG. 72 interface with the end clip of FIG. 72 and inserted wall elements;

FIG. 74a shows an axisymmetric-end element having an axisymmetric truss geometry;

FIG. 74b shows an axisymmetric-end element having symmetric truss geometry;

FIG. 75 shows dimensions defining the features of the axisymmetric truss of FIG. 74a;

FIG. 76 shows the thin wall thicknesses on either side of a triangular truss hole;

FIG. 77 shows how a rounded rhomboidal center plug can fit into either orientation of a truss hole;

FIGS. 78a,b shows how a panel with numerous rhomboidal plugs can be rotated 180° and still fit the same truss holes if the truss is properly designed;

FIGS. 79a,b shows a different, smaller corner type of plug on a panel that can also fit in the truss cross-section when rotated 180°;

FIG. 80 shows details of the smaller corner plug geometry;

FIG. 81 shows a V-shaped plugged panel that is constrained when engaged with two parallel truss sections;

FIG. 82 shows a V-plugged panel that can fit into a square of trusses in any 90° rotated orientation;

FIG. 83 shows how corner plugs of FIG. 79 and either the rhomboidal or V-shaped plugs of FIGS. 78 or 81 can occupy the same space of one truss hole;

FIG. 85 shows one possible type of a divider with small corner plugs at either end;

FIG. 86 features close-ups of the ends of other possible divider styles all using pairs of small corner plugs;

FIG. 87 shows a side view of the insertion of a divider and how it plugs into a trussed section;

FIG. 88 shows a locating stub element that is used on the opposite end of a divider panel to constrain and fix the divider in a trussed storage-"cubby";

FIG. 89 shows how the locating stub of FIG. 88 engages with the leading end of a divider as it is attached into a trussed wall;

FIG. 90 shows a side and an end view of a plug-in attachment that features an asymmetric joint end orthogonal to the direction of plug insertion;

FIG. 91 shows the insertion of an orthogonal plug-in of FIG. 90 into a trussed wall already having an inserted divider with interfering;

FIG. 92 shows how the axisymmetric joint elements depicted in FIGS. 27 and 29 can readily be attached to the orthogonal plug-in of FIG. 90, thus allowing for building structures along orthogonal axes;

FIG. 93a,b,c shows plug-ins having different end joint elements: 90° asymmetric (like that of FIG. 27), 45° asymmetric (like that of FIG. 32) and straight barb (like that of FIGS. 45 and 46). Plug-ins can also accommodate other joint end geometries;

FIG. 94 shows a door accessory that can slide into orthogonal plug-ins using two elements like that in FIG. 29 but with shafts to accommodate a swinging door;

FIG. 95 shows the front and top views of a door accessory of FIG. 94;

FIG. 96 shows how a door accessory like that in FIGS. 94 and 95 and an attached orthogonal plug-in can be inserted into a trussed section over an already-inserted divider attachment without interfering;

FIG. 97 shows a side and two front views of a door accessory that can plug into a trussed wall directly without an attached orthogonal plug-in;

FIG. 98 shows how a divider and a plug-in door accessory like that in FIG. 97 do not interfere and can thus be inserted into or removed from a trussed wall independently of one another;

FIG. 99 shows how a plug-in door like that of FIG. 97 can be inserted over a storage-"cubby" of trussed-walls over an existing divider and next to an adjacent storage-cubby already having a plug-in door and divider in place;

FIG. 100 shows a back plate accessory employing V-shaped plugs like those described with FIGS. 81 and 82;

FIG. 101 shows how a back plate like that in FIG. 100 can be inserted over a locating stub of FIG. 88 without interfering;

FIG. 102 shows how a locating stub can be inserted into a truss section after a plug-in back plate has already been attached into the trussed wall structure;

FIG. 106 shows how the 45° elements of FIGS. 32 and 33 can be interlocked without forming a 45° angle;

FIG. 107 shows how the 90° elements like those of FIGS. 27 and 54 can be interlocked without forming a 90° angle;

FIG. 108 shows a 90° axisymmetric joint end element with asymmetric barb features;

FIG. 109 shows a close-up of the element in FIG. 108 showing details of the asymmetric barb geometry;

FIG. 110 shows how the configurations of FIGS. 106 and 107 are prevented by using asymmetric barb features;

FIG. 111 shows how the axisymmetric elements ends with asymmetric barb features of FIGS. 108 and 109 still form the proper interlocking joint like the joints of FIGS. 28, 56 and 57;

FIG. 112a,b shows a truss shaped beam where the cells are triangular and a beam formed not from trusses, but from rectangular (in this case square) cells;

FIG. 113a,b shows the cross sections of the truss, and a solid section beam with the same amount of material;

FIG. 114 shows how the truss-type extrusion can itself be used to fabricate modular board-like elements which can fit together to form wider plates; and FIG. 115 shows how the truss-type extrusion can itself be used to fabricate modular board-like elements for uses such as strong lightweight shelving or the like.

THE INVENTION

Figure 24:
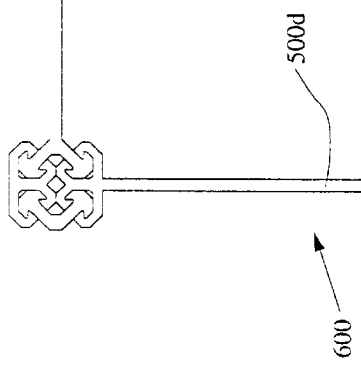
FIG. 24 shows a cube made from the elements of FIGS. 21, 22 and 23.

People's basic needs are food, clothing and shelter. There is also the need for storage, which is directly related to the three most basic needs; food and clothing must be stored, and shelter is the "storage" of people. This set of inventions addresses new solutions to the storage dilemma, as current products and systems leave much to be desired for the home, office and retail space, as previously pointed out. As population grows, the need for storage and the ease of transporting the objects to be stored also increases. This need is evident in both the domestic and business environments, where objects of all sorts must be stored. The storage solutions should be light, modular, versatile, customizable, easy to assemble and disassemble and structurally sound. Material, safety, manufacturing concerns, and the environment must also be considered. Also, the systems should be aesthetically appealing and affordable. In some cases, the systems should be entertaining and fun, and can also be used as teaching aids.

Although, as earlier discussed, some prior designs satisfy the needs of specialized storage solutions, there are few designs that are universal (relating to the larger definition of the storage of person and property); and, as before pointed out, prior designs may not be appropriate to be used in varying storage tasks—for example, the storage solution of one kind of goods may not at all be appropriate for storage of other objects. Other designs and products in the market, as discussed in the background of the invention, also fail fully to accommodate the wants and needs of users and customers.

The inventions now to be detailed address these concerns and provide designs that also combine form and function into the same product.

The first embodiments describe a modular storage element that also has play-value, provides entertainment and encourages creativity, organization and tidiness in children.

Other embodiments are low-cost modular storage solutions the elements of which can be formed by common processes such as extrusions and injection molding, and that require a minimum number of parts. The physical and structural properties and behavior under typical uses and applications are carefully considered and accommodated by the design features, including, but not limited to, barbed interlocking joints, load and moment distribution throughout system members, and element symmetry configurations.

Although well designed for use as modular storage, such as shelving and crate container alternatives, the designs and features of the invention may also be scaled to form larger systems such as shelters, housing construction components and workspace management systems, before discussed, often called office cubicles and integrated furniture systems. The designs may similarly be scaled to form smaller systems such as toy elements and toy sets, accessories to toy systems, and children's entertainment and teaching aids.

A first design relates to modular storage units and plural systems that also have play-value and that also encourage the user to be more creative and neater with their toys. LEGO®-type blocks, for example, are universally popular and recognized building toys. If they could be formed also to be able to create storage cubes, the cubes can then become part of an integrated building and play system that would encourage children to have fun while being neat. Drawers and doors may also be added and the cubes used to build usable furniture such as bookcases, desks and a bed platform and the like.

Turning to FIG. 1, a typical large prior LEGO®-type plate 1 is shown, formed with large studs 2 and mating socket surface 3, sold under the Duplo® tradename. Such, however, is not practical to form into a cube from these elements, even if orthogonal surfaces were provided, because, when loaded, the sockets easily pull away from the studs.

The invention remedies this deficiency as illustrated in FIG. 2, through the use of a modified plate 6 with 45 degree angled ends 5 and 8, the 45 degree end surfaces diverging at the ends from the plane of the plate. The inner surface of the plate 6 has studs 7, and the outer surface 9 has mating sockets. Similarly, one 45 degree angled end 8 has sockets on the outside, and the other end 5 has studs 11 on the inside. While the end 5 is bent upwards as shown in FIG. 2 at −45 degrees from the vertical to the left, the end 8 is similarly bent at +45 degrees from the vertical divergingly oppositely to the right, and with an externally downwardly inclining crook or step 8, shown making a right angle with the end surface 8, for receiving an end 5 of an adjacent plate 6.

The plate 6 mates with another type of plate 16, shown in FIG. 3, which is in a sense the mirror image of plate 6. Plate 16 also has 45 degree angled ends 15 and 18 corresponding to the ends 5 and 8 of plate type 6, and with the end surface 18 having an inward crook or step 18' corresponding to the step 8' of plate type 6. The inner surface of the plate 16 has socketed surface 17, and the outer surface 19 has mating studs 20. Similarly, the 45 degree angled end 18 has sockets 19 on the outside, and the other end 15 has studs 21 on the inside.

FIG. 4 shows how plates of the type shown in FIGS. 2 and 3 may be combined to form a cube 100. Two plates 6e and 6d are of the type of plate 6 shown in FIG. 2. They have studded surfaces 7e and 7d on their inner surfaces and socketed surfaces 9e and 9d on their outer surfaces, respectively. It should be noted how their opposite ends of the type 5 and 10 shown in FIG. 2, mate together with studs and sockets. Because the joint is made at a 45 degree angle, it prevents the bottom of the cube from dropping out when the cube is loaded and supported from the sides, such as when an array of cubes is to be formed into a bridge structure, say, for example, spanning the workspace of a desk. The corners nest tightly to create a strong joint. For example, end 5d of plate 6d nests tightly in the step or crook 8e' of end 8e of plate 6e.

The other two sides of the cube 100 are formed from plate type elements 16e and 16d that are of the form 16 shown in FIG. 3. Here, the inner surfaces 17e and 17d are socketed and the outer surfaces 20e and 20d are studded. Once again, the sockets and studs of the 45 degree ends allow the plates 17e and 17d to join with the other plates 16e and 16d to complete the cube 100. The result is a cube 100 with beveled corners and studs on two exterior adjoining sides, and mating sockets on the other two adjoining sides.

An impediment to the sale of many prior modular storage devices is the fact that the producer is shipping a lot of air, and the retailer has to use a lot of shelf and storage space, which is costly. Shipping the cubes as plates which are then assembled, on the other hand, creates a huge cost saving. In the case of the cube, for example, shown in FIG. 4, the sides can be glued together after assembly. A high quality PVC type of plastic, such as used by LEGO®, can easily be glued together using PVC pipe cement. This melts the plastic together, and the resulting fused joints create a cube as strong as if the entire cube had been molded at once. Of course it is also considered in the spirit of this invention to mold a cube all at once, if desired, with studs (bumps) on two of the sides, and sockets on two of the other sides, such that the cubes can be stuck together and the joints bridged with cap plates, as shown in FIGS. 5 and 6.

While this cube by itself will not be able to resist large shear loads which could cause it to fold up into a rhombus shape, when several such cubes are joined together, with exterior studded surfaces mating with exterior socketed surfaces, however, a very sturdy array is formed, as shown in FIG. 6. Here, the four cubes 100a, 100b, 100c, and 100d are stuck together. Exterior joints are strengthened, shown only on the bottom joint in the drawing, with standard plates of the type shown in FIG. 1. Plates 1c, 1d, and 1e bridge the bottom joint greatly to rigidify it and prevent the system from collapsing into a rhombus. A back plate, with studs pressed into sockets on the ends of the plates, may also be used to give shear strength.

The detail that enables this rigidifying effect to occur is more clearly shown in FIG. 5. Elements 16a and 6a of the cube 100c form a joint with elements 6b and 6c of another cube 100d. Element 16a has an angled end 15a with studs 21a that mate with the socketed exterior surface of angled end 8a of plate 6a, which, in this example, happens to have studs 7a on its inside surface. Similarly, element 6b has an angled end 8b, the socketed outside surface of which mates with sockets 11c on the angled end 5c of element 6c. Element 16a has studs 20a on its outside surface, and these will mate when pressed together with sockets on the outside surface of element 6b. This provides a very effective joint to transmit shear loads. It can, however, be pried apart by tensile loads. To prevent this from happening, the bottom plate 1b is employed. The bottom surfaces of both adjoining cubes plates 6a and 6c have socketed exterior surfaces, so the studs 2a of plate 1a can be pressed into them to form a bridge that is effective at transmitting tensile forces across the bottom surface of the joint, thereby preventing the plate elements 16a and 6b from being pulled apart.

This type of joint that mixes strength directions of studs and sockets so that shear capability in one direction prevents a neighboring differently oriented set from being pulled apart and vice versa is the essence of this embodiment of the invention. The 45 degree element based joints are one embodiment that through the principle of a triangle as a brace, creates a very rigid joint when cubes are pressed together and a flat plate is pressed to the joint to form the chord of a triangle with the 45 degree elements. Different types of angles may also be used and will occur to those skilled in the art of joint design.

To illustrate the different types of joints that can be used in accordance with the invention, consider the plate elements in FIGS. 7 and 8 which have simpler designs than the plate elements of FIGS. 2 and 3 and hence will be less costly to mold. In FIG. 7, plate element 76 has angled ends 75 and 78, but they are not cantilevered from the main surface of the plate and therefore allow for easier mold design. The end 75 has socketed surface 81, and the other end 78 has studded surface 80. The inside of the plate has studs 77 and the outside surface 79 has sockets. In a mirror image fashion, FIG. 8 shows a plate 86 where the inside surface 87 is socketed and the outside surface has studs 90. One end 88 is angled inward and has studs 89, and the other end 85 is also angled inward and has a socketed surface 91.

FIG. 9 shows how two elements 76d and 76e with studded surfaces 77d and 77e and exterior socketed surfaces 79d and 79e are joined together, studded end 78e to socketed end 75d. Similarly, elements 86e and 86d with interior socketed surfaces 87e and 87d and studded exterior surfaces 90e and 90d are joined together and then with elements 76e and 76d to form a cube 100g. Cube 100g is somewhat more prone to racking (collapse under shear loads), so it should be joined to other cubes, where the same principles of the joint shown in FIG. 5 may be used greatly to rigidify the elements.

Variations of the elements 76 and 86 of FIGS. 7 and 8 are shown in FIGS. 10 and 11. Element 150 in FIG. 10 is similar to element 76 of FIG. 7 except that element 150 has an extra stud 156 and socket 155 on end 152 and also an extra stud 154 and socket 153 on end 151. Element 160 is also like element 86 but has extra stud 164 and socket 163 on end 161 and extra stud 166 and socket 165 on end 162. Elements 150 and 160 form storage-"cubbies" as shown in FIG. 12. Elements 150a, 150b, 160a and 160b form cube 120 in the same fashion as described in connection with the embodiment of FIG. 9. The addition of two-stud-two-socket plates 170a–h, which are currently available as the before described Duplo® blocks, increases the cube strength as the flat plates 170a–h mate with the added studs and sockets of the wall elements. For example, plate 170a mates with extra stud 156a on wall element 150a and stud 166b on element 160b in the interior of cube 120. Plate 170g also mates with stud 164b on element 160b and stud 166a on element 160a in the interior of cube 120. Plates 170c and 170e also mate on extra studs in the interior of cube 120. Studs on plates 170b, 170 d, 170f and 170h mate with the sockets on wall elements 150a, 150b, 160a and 160b on the exterior of cube 120. The added plates 170a–h do not extend beyond the square frame boundaries of cube 120 so that arrays of cubes can be formed. As an example, FIG. 13 shows two cubes 120a and 120b mated along one side using the elements of FIGS. 10 and 11 and the basic two-stud- and two-socket-plate elements of FIG. 12. The addition of the mating plate elements greatly increases the racking resistance of a single cube as there now exists mating in two directions at each corner of a cube, one from the mating ends of wall elements and one from the orthogonally-mating plate attachment.

In the formation of the cubes as shown in FIGS. 9 and 4, when the cubes are put into an array as shown in FIG. 6, the interfaces between the cubes create double walls. To eliminate the cost of such, where desired, a double pronged end element may be used as shown in FIG. 14, the element 406 has a studded surface 407 and a socketed surface 409 on the other side, with the prongs diverging at + and −45 degrees to the plane of the plate above and below the plane as shown. One end has a 45 degree prong 405 extending above the plate with bumps 411 on one side. On the same end of element 409, there is now provided a second opposite 45 degree prong 413 below the plate with a socketed surface 412. The other end is like a mirror image, with the upper 45 degree prong 408 this time having socketed surface 410 and its lower 45 degree prong 415 having a studded surface 414. Similarly, in FIG. 15, element 516 is like a mirror image of the element 406 in FIG. 14. One surface 517 is socketed and the other surface 520 is studded. One end has a 45 degree prong 515 with studs 521, and the neighboring 45 degree angled surface 524 has socketed surface 525. At the other end of the element 516, there is a 45 degree angled prong 518 with socketed surface 519 and a neighboring 45 degree angled surface 522 with studded surface 523.

FIG. 16 shows how these elements can be used to form cubes, in which, now, the adjacent walls of cubes are shared. The exterior walls of the cubes may be made from elements of the type 6 and 16 in FIGS. 2 and 3 respectively. Cube 400a is made from elements 6h, 516a, 406a, and 6i. Cube 400b shares element 516a with cube 400a and has its other sides made from elements 6g, 516c, and 406b. Cube 400d shares element 406b with cube 400b, and has its other sides made from elements 516d, 405d, and 516b. Note, for example, that element 516d can be used to continue the sequence of cubes; but element 406d terminates the upward growth of cubes. Cube 400c shares sides 516b and 406a with cubes 400d and 400a, respectively. Joining plates 1h, 1k, and 1n are used to tie together and rigidify the joints between cubes 400a and 400b, 400a and 400c, and cubes 400c and 400d, respectively. Thus rigid joints are formed as shown in detail in FIG. 5. Plate elements 1i, 1g, 1j, 1l, 1m, and 1o merely make the remaining surfaces flat and even with the joining plates.

All of the LEGO®-type cubes, furthermore, can also have studs molded into the edges, so that large plates can be pressed onto the backs of the cubes to give them greatly increased shear strength. This will help hold them together and help prevent them from folding up into rhombi when side loads are applied.

The fundamental use of interlocking elements with mirror image ends to form joints resistant to loads that would otherwise pull the joints apart or shear them into rhombuses can be evolved to include a class of extruded shapes that are slid together along an axis parallel to the joint instead of being pressed together in a direction normal to the joints, which, indeed, makes the joints susceptible to being pried apart and hence may require bracing. Embodiments of this concept are shown in FIGS. 17 through 68. The uniqueness of this idea is that one basic type of extruded element forms the walls and the joints of the cubes, so a minimum number of pieces is required, as opposed to previous attempts in the prior art to form series of dovetails that are then locked together with separate mating keys, as before described.

The first and simplest of this type of embodiment is shown in FIG. 17, where a plate element 200 is formed with two rounded convexly curved dumbbell-like protuberances 201 and 202, extending transversely at right angles to and above and below the plate on one end and which are below the plate on one end and which act as keys in a joint, and a block 203 with rounded hollow concave receptacles 204 and 205 on the other end which act as key ways in a joint. FIG. 18 shows just a block element 303 with hollow cavities 305 and 304 that would be used as a terminator element. Similarly, FIG. 19 shows a terminator element 306 with rounded convexly curved protuberances 301 and 302.

These simple elements 200, 303, and 306 are combined to form a series of cubes as shown in FIG. 20. Cube 250 is formed by elements 200b, 200c, 200d, and 200j. The joint between 200b and 200c is completed with the use of terminator 306a and the element 200a which also is used to form another cube in the series. Similarly, the joint between elements 200b and 200j is completed with elements 200l and 200k that are usable to form other cubes. The joint between sides 200j and 200d is completed by elements 200i and 200h that also are used to form other cubes. Finally, the joint between element 200d and 200c is completed with terminator 303a and element 200e that is used to form neighboring cube 25l. Cube 25l is thus formed from elements 200d (which it shares with cube 250), 200e, 200f, and 200h. The joint between sides 200e and 200f is completed with terminators 303b and 306b, and the joint between elements 200f and 200h is completed with element 200g and terminator 306c.

It can be seen from the convex-concave geometry of the key and key-way forms of the ends of the elements, that the joints themselves resist all forms of loads that would be applied to and otherwise act to deform the cubes. As moments and loads are applied, however, the rounded keys tend to spread apart the rounded key-ways by a wedging action. This requires substantial strength to be built into the key-way elements to prevent this spreading action. Similar spreading may also occur when a dovetail shape is used.

Where this is of concern, a generation of a more complex joint is desirable, but one that is self-locking, so the pry-apart forces that cause the round key ways to spread, actually cause the keys to become more tightly locked and integrally to hold the key ways together to prevent spreading. A natural shape with which to accomplish this goal, in accordance with the invention, is that of a barb. In a manner similar to that of a fish hook, the more load that is applied, by either a swimming fish or a heavy load of books, the barb grabs harder and resists being pulled out.

Once again, the goal is to create a single extruded element, that, for example, can be made from thick sections of inexpensive materials, such as regrind plastic (e.g., from recycled milk bottles or reclaimed polyvinyl chloride) that can be interlocked to form as large an array of interlocking storage cubes as may be desired. In schools, for example, such an array of "cubbies" provides a place for each child to place work, lunch boxes, outdoor clothes, etc.

Figure 23:
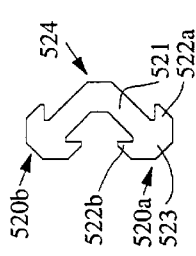
FIG. 23 shows a male arrowhead form end cap.
Figure 22:
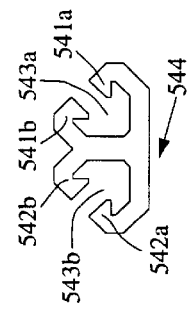
FIG. 22 shows a female mating arrowhead form end cap.
Figure 21:
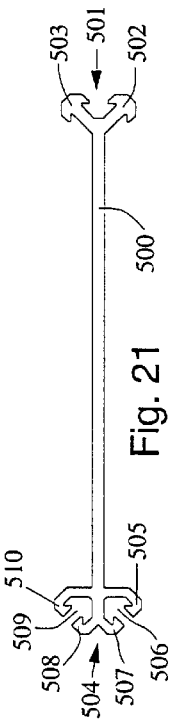
FIG. 21 shows an extruded plate element with a pair of arrow-shaped prongs on one end and a double mating female form on the other end, such that when four such plates are slid into each other to form a cube, the male arrows form self locking joints with the female forms that are virtually impossible to pry apart, thereby forming an extremely sturdy cube structure.

FIG. 21 shows the fundamental element of this modified system. Here a single piece extrusion 500 has a double arrow-like barb on one end with elements 502 and 503. These barbs are shown in greater detail in FIG. 23 which shows them as part of a terminator element 524 similar to that of 306 in FIG. 19. The barb 520a, and similarly its symmetric partner 520b, has a shank 521 and a head 523. The barb points 522a and 522b grab in corresponding female barb arrow-shaped opening cavities or receptacles in the mating end, such as shown in FIG. 22. The other end of the element 500 in FIG. 21 has the female mate 504 to the male barb 501. The female receptor 504 has a barbed internal cavity 506, bounded by barbed arms 505 and 507, and cavity 509 is bounded by arms 510 and 508. FIG. 22 shows an end terminator similar to terminator 303 in FIG. 18, with the cavities 543a and 543b bounded by barbed arms 541a and 541b, and barbed arms 542a and 542b, respectively.

In an assembly, an element similar to 500 has its male barbs slide into the cavities and snugly fit. When loads are applied to the joint, the tendency would be for the joint to try and pry itself apart; but the barbs catch on the internal barbed features and they will lock up. FIG. 24 shows a cube 600 made from these types of elements. Identical elements 500a, 500b, 500c, and 500d make up the walls of the cube. Additional similar elements can be added by sliding the male barbed ends into female barbed receptors to create a matrix of cubes that grows in any desired direction. Just a single cube is shown, where the corners are completed and given structural rigidity using the terminator elements shown in FIGS. 22 and 23.

Figure 25:
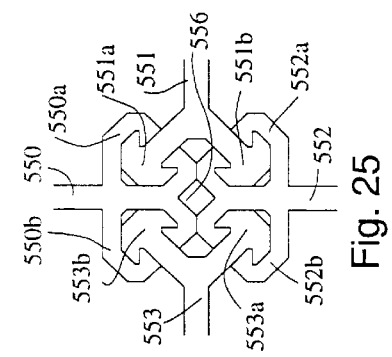
FIG. 25 shows the detail of the joint formed by plate elements of FIG. 21.

FIG. 25 shows the detail of a joint between elements such as 500 in greater detail. Plate elements 550, 551, 552, and 553 all come together at the intersection of 4 cubes. Element 551 has male barbed ends 551a and 551b that mate in receptor 550a on the end of element 550 and in receptor 552a on the end of element 552. Element 553 has a male barbed end 553b that mates with receptor 550b on the end of element 550. Element 553 also has a male barbed end 553a that mates with receptor 552b on the end of element 552. The result is a very rigid self-locking joint that approaches the strength of a solid molded joint. Indeed, to lock it into place, a self threading screw can be threaded into the cavity 556 at the center of the joint, if desired. A long bolt or screw may also extend through the hole 556 to anchor the unit to a wall.

Figure 26:
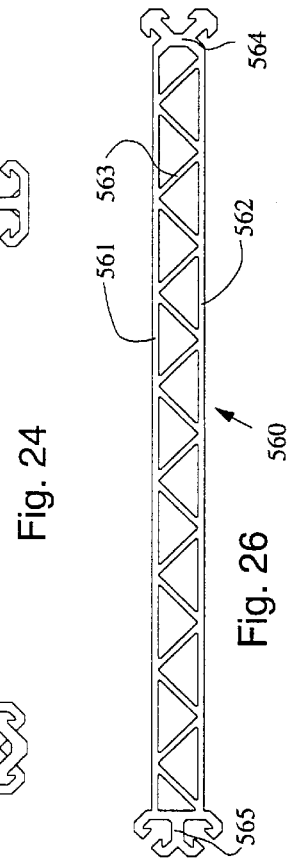
FIG. 26 shows how the plate of FIG. 21 may be extruded to have a socketed surface that would mate with a plate with angled ribs to form a very strong plate truss that greatly increases the buckling resistance and load capacity of the system.

This novel self-locking barb joint can be made, for example, from extruded aluminum, or even from extruded plastic. Where heavy loads are to be supported, a more complex extrusion can be made that essentially forms a truss element, instead of a simple plate as shown in FIG. 21, to join the male barbed end to the female receptor end. If an aluminum extrusion is used, this truss with closed cells may be directly extruded. A plastic extrusion can be made also; for example, a two-piece plastic extrusion where the top chord of the truss is attached to the barbed male and female ends. The lower chord of the truss and the diagonal braces may be a second extrusion and they would slide into the first. The joints may, for example, be of the convex circle and concave socket type shown in FIG. 20. FIG. 26, shows the extruded truss design 560, where top chord 561 and bottom chord 562 are connected by diagonal elements such as 563. One end of the extrusion has a male barbed element 564 and the other end has a female concave barbed element 565.

Figure 29:
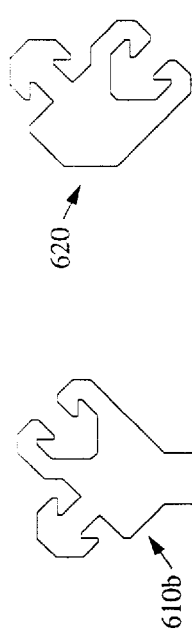
FIG. 29 shows the end-cap element needed to complete the joint at a free-edge.
Figure 27:
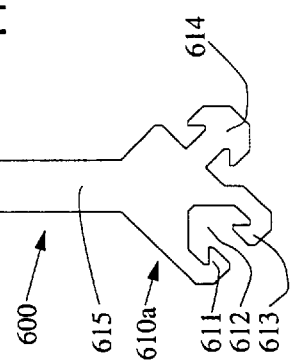
FIG. 27 shows a variation on the barbed arrow and barbed slot theme, where the part is axisymmetric.

As a further modification, in FIG. 27, another barbed element like that of FIG. 21 is shown, but now with axisymmetric end features. Element 600 has a plate component 615 connecting two ends 610a and 610b. These ends 610a and 610b are exactly the same when given a 180° rotation about the center of the plate center. Each end has one male barb 614 (shown on end 610a) and one female barb mate 612 formed by barb arms 611 and 613. FIG. 29 shows a terminator element 620 having the same features as each end of element 600 to serve in the same joint completion role as terminator elements in FIG. 22 and 23. Since the end features are axisymmetric, however, the joint requires only one geometry of termination, also axisymmetric, as opposed to the two symmetric geometries of FIGS. 22 and 23. This results in less expensive manufacturing and inventory costs since only one design of the barb-and-mate features is required, and only two basic elements (one wall and one terminator) must be produced, distributed and stored. Such simplicity reduces storage-"cubby" construction and the number of unused parts since it is less confusing in determining how many pieces of which terminator type are required to complete an array of cubes.

Figure 30:
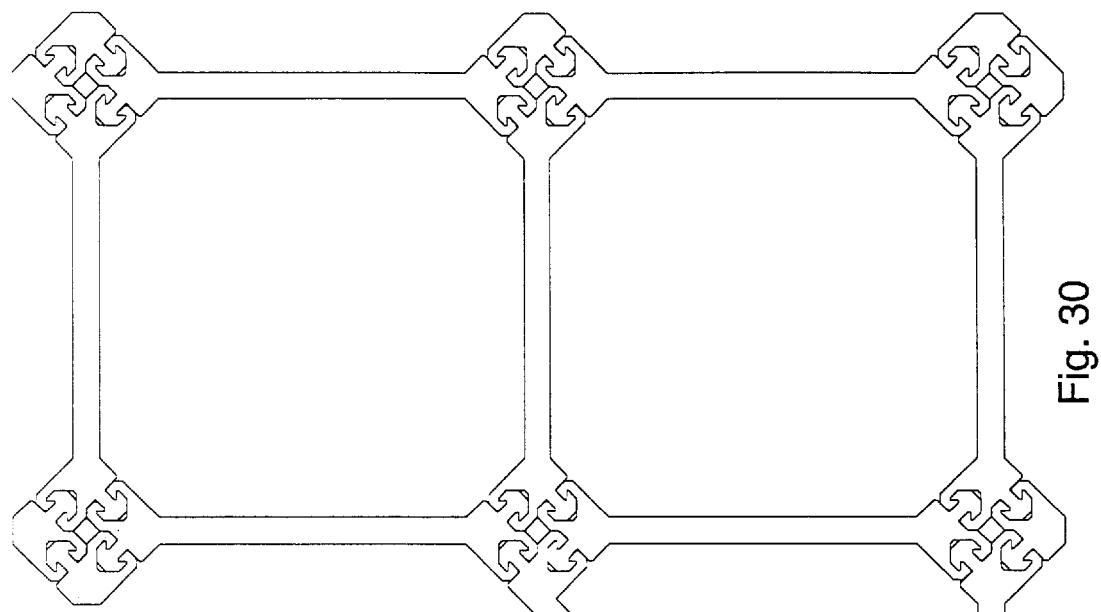
FIG. 30 shows a portion of a system that has been assembled to provide modular storage using the axisymmetric elements.
Figure 28:
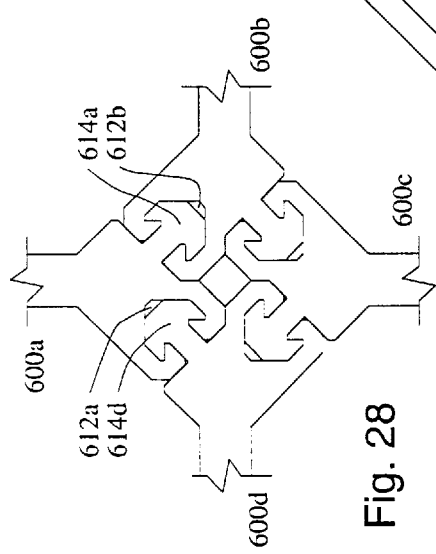
FIG. 28 shows the type of even stronger interlocking joint that is obtained with the axisymmetric element of FIG. 27.

Simplicity in piece-part count is further shown in FIG. 28—a detail of a joint comprising four elements 600a, 600b, 600c and 600d. The barbs interlock with the neighboring element female barb mate. For example, barb 614d on element 600d interlocks with barb mate 612a on element 600a. Similarly, barb 614a engages with barb mate 612b of element 600b. This joint is structurally equivalent to the joint shown in FIG. 25, using the mechanical properties of barbs and the compression and tension effects of a mostly filled joint cross-section. FIG. 30 shows a storage-"cubby" structure made up of elements shown in FIG. 27 and 29, along with a diagonal element 630 having ends of the same one-barb-one-mate geometry. Again, the completed four-element joint at each corner of the cube is strong against diagonal loads that cause other non-barbed joint designs to collapse or come apart.

Figure 31:
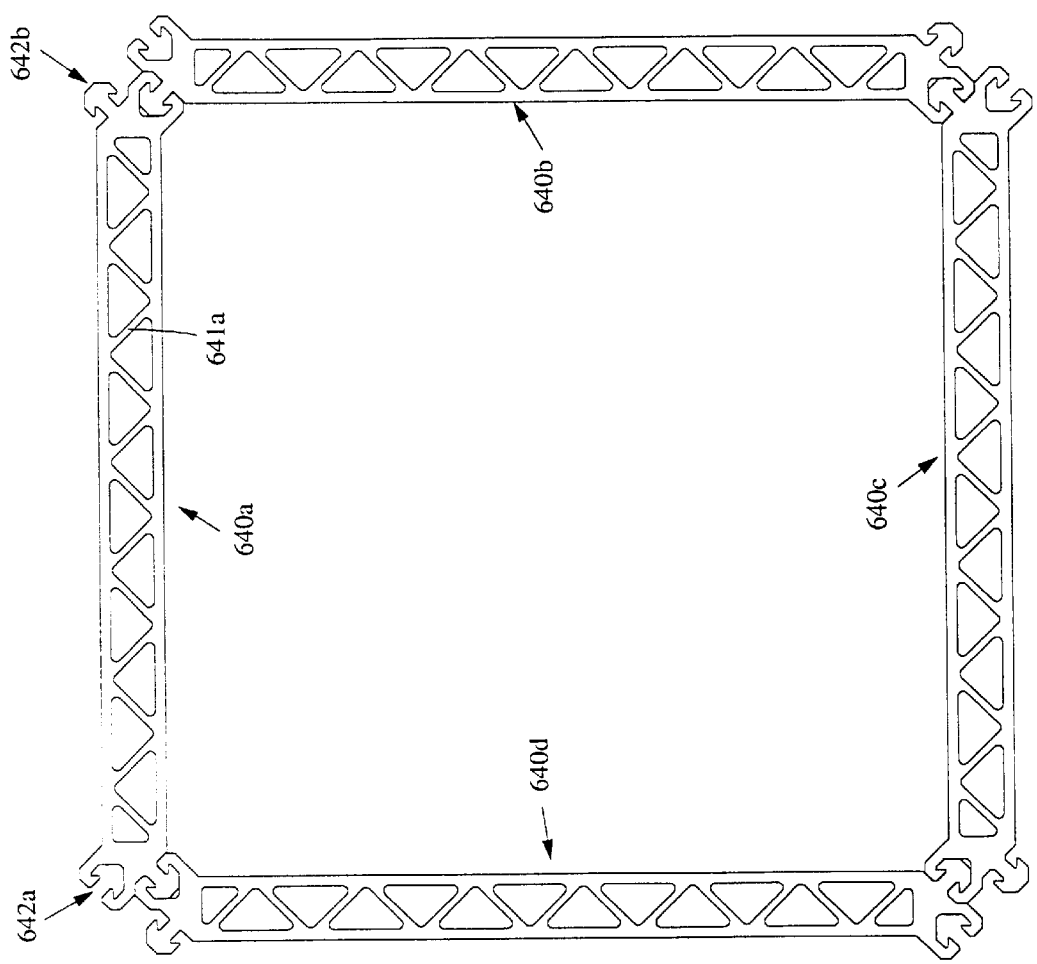
FIG. 31 shows a cube that has been assembled using axisymmetric elements where the plate regions between the ends is formed, e.g., extruded, as a truss to maximize strength and minimize weight (cost)

FIG. 31 shows a storage-"cubby" formed with axisymmetric elements 640a, 640b, 640c and 640d using trussed designs of the basic element 600. Element 640a, for example, has the same one-barb-one-mate ends 642a and 642b, while the wall component is formed with truss members 641a. Again, the truss design provides greater strength-toweight ratios and can be extruded in plastics and aluminum, for example.

In FIGS. 27–31, the angle between joined members is 90°. By defining N as the number of members completing a joint, in this case N=4, then it is clear that the product of N and the angle between mated members is 4×90° =360°, or a complete circle or "circuit."

Since the axisymmetric geometry of element 600 in FIG. 27 forms a "closed circuit" of connection as shown in FIG. 28, axisymmetric design can be used to form joints with different mating angles between wall elements. Or, the number of elements can theoretically be any integral number, and the joining angle between mated elements is thus 360° N. FIG. 32 shows another axisymmetric structural member 800 similar to that in FIG. 27 but designed for N=8. This end design allows eight elements to form a strong, complete joint in which the mating angle is 360°/8=45°.

This element 800 has a wall or plate component 815 and ends 810a and 810b. Each end has a male barb 814 and a female barb mate 812. In this particular end design, a faceted end surface 816 is provided. FIG. 33 shows a close-up of the end of this element. Barb mate 812 is formed by barbed arms 811 and 813. FIG. 34 shows the same end features on a terminator element 820: a mate barb 824 and a female mate 822 formed by barbed arms 821 and 823. The difference in this design is that the angle between the male barb centerline and the female mate centerline is more obtuse that the particular designs shown in FIGS. 27–31. This, in some instances, is more desirable in a joint because the direction of force resulting from the barb engagement approximates a circular circuit of force distribution throughout a completed joint, and is also defined by the axisymmetric condition that all end members have the same geometries if only one barb and one mate per end are used.

FIG. 35 shows a longer element 830 like element 800 also having the same ends with a barb 834 and a mate 832 formed by barbed arms 831 and 833, but a longer plate segment 835. FIG. 36 shows a central core element 840 having a center through hole 841 and a faceted outer surface 842. FIG. 37 shows a completed joint using elements of FIGS. 32 and 35 and a core element. Short elements 800a, 800b, 800c and 800d and long elements 830a, 830b, 830c and 830d complete a barbed closed circuit joint. For example, barb 814a on element 800a engages with female mate 832a on long element 830a, while barb 834a on long element 830a engages with female mate 812b of short element 800b. Center core 840 engages with faceted surfaces of the element ends, making the joint even more rigid. The faceted surface not only compresses the joint material essentially to preload the joint, but also opposes any twisting of an element from the immobility of the core element. For example, faceted surface 816a on element 800a meets with faceted surface 842a of the core piece. When element 800a undergoes a twisting force with an axis parallel to the joint axis, the faceted surface interaction opposes such an action as the center core 840a is considered rigid, and the faceted surfaces engaged with the faceted end surfaces of the other element also prevents the center core from rotating in reaction to the twist force on element 800a. The core element also has through hole 841a which allows for a bolt to run the length of the joint to lock the joint together and prevent the de-sliding detachment of elements or to anchor the structure to a wall. The compression of the center core, by a tightened nut and bolt through the hole 841a, for example, may be used to cause an expansion in the radial direction of the core to further pre-load the joint, particularly if the center core is made of a material with an appropriate Poisson's ratio.

FIG. 38 shows a side piece 850 that has a male barb 852 and a female barb mate 851 having the same shape as the element barbs and mates of FIGS. 32–35. It also has a faceted inner surface 853. This side piece is equivalent in features to three joined terminator elements 820. FIG. 39 shows one use of such a side element in a joint. Two elements 800e and 800f are oriented 180° from one another. Two side elements 850a and 850b mate with the wall element barbs and mates. Core piece 840b completes the joint. The joint in FIG. 39 shows that two shorter elements can be joined to form a longer element, in case a user wants a longer wall. Obviously, one side piece 850 can be used on an edge joint location in an array structure to minimize the number of individual terminator elements 820 required to complete the joint; that is, one side piece would replace three mated terminator elements.

This principle is applied to the corner element 860 in FIG. 40. This corner piece is equivalent to five mated terminator elements, as it has a barb 862 and barb mate 861 and an inner faceted surface 863. FIG. 41 shows one application of such a corner element. Wall elements 800g and 800h join with terminator element 820a and corner element 860a, with center core 840c. The barb 814g on element 800g engages with mate 861a on corner element 860, and barb 862a on the corner piece engages with mate 812h on element 800h.

FIG. 42 shows a possible structure using the 45° joining elements of FIGS. 32, 34, 35, 36, 38 and 40. The side and corner elements simplify the edge joints of the structure, thereby reducing joint size and thus weight, providing a single, smooth, flat surface along the joint length. By using side and corner elements, moreover, any fit mismatches resulting from using multiple terminator elements are eliminated, thus making the joint stronger.

Figure 43:
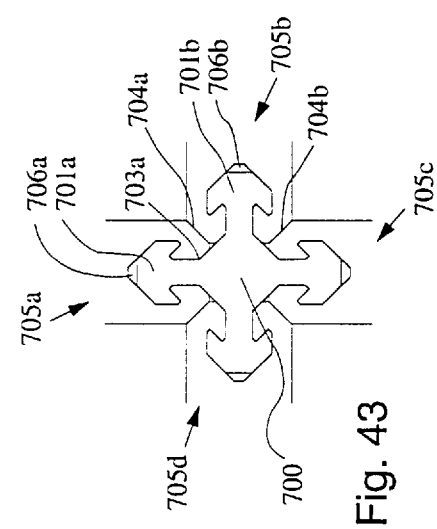
FIG. 43 shows how the basic concept of the barbed joint can be used to form other joints, where in this case, the plates that make up the sides will all have barbed slots at their ends, and the joint is made from a four-barbed cross.

The barb and compressing element end surfaces are also used in another modified joint design. In FIG. 43, four wall elements 705a, 705b, 705c and 705d have single, symmetric female barb mates, mating with a center piece 700 which has four single male barbs in the shape of a cross. For example, barb 701a on the center element 700 mates with barb mate 706a on element 705a, and barb 701b on center element 700 mates with mate 706b on element 705b. The surfaces of the elements also meet with the center piece surface, strengthening the joint. The faceted end of element 705a, for example, meets with the surface of center element 700 at location 703a. At locations 704a and 704b the faceted end surface of element 705b meets with that of element 705a and 705c, respectively.

Figure 45:
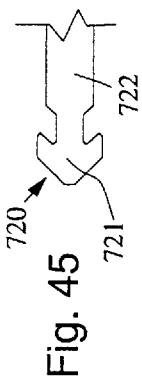
FIG. 45 shows how a plate with barbed ends can have a solid cross-section, thereby minimizing extrusion die complexity.
Figure 44:
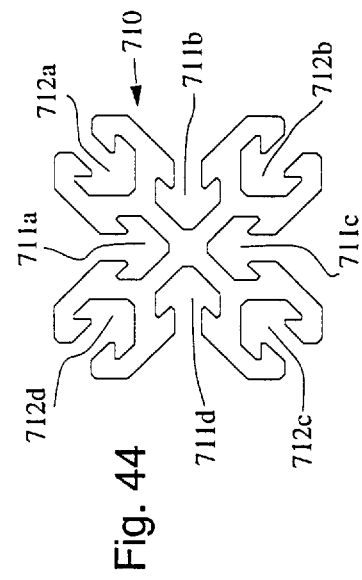
FIG. 44 shows the inverse, where the joints are all made from a cross of eight female barb sockets, and the side plates would all have barbs on their ends, such that the joint can support orthogonal plates, or 45 degree racking-resistance plates.

FIG. 44 shows the single symmetric barb design in reverse. The center piece 710 has female barb mate features 711a, 711b, 711c and 711d. Also designed into the element are diagonal female mates 712*a–d*. As in FIG. 43, wall elements join with the center piece using the single barb and single mate engagement. The diagonal features now, however, allow wall elements having male barbs to join with the center piece at 45° angles to the basic joined elements. FIG. 45 shows the end of such a wall element 720 having a single male barb 721 on each end. For simple tooling in manufacturing, element 720 has a solid cross-sectional wall component 722. For greater strength-to-weight properties, a trussed element 730 can also be used, having the single male barb 731 and truss geometry 732.

Figure 47:
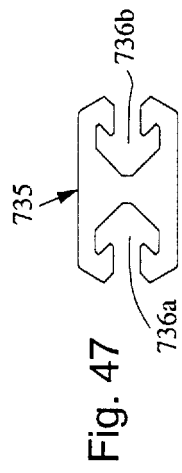
FIG. 47 shows a connecting piece that can be used to connect barbed elements at 180° instead of using the multiple-barb-mated cross of FIG. 44.
Figure 48:
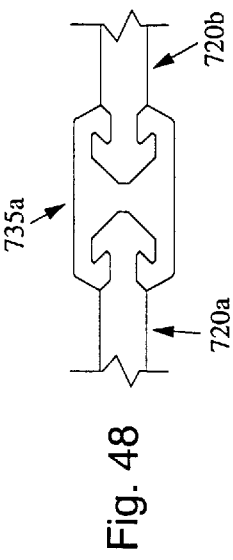
FIG. 48 shows two barbed elements joined with a connection piece of FIG. 47.

FIG. 47 shows a connector element 735 which can be used to couple two elements of type 720 or 730 for lengthening, or when the full multi-directional cross-piece of FIG. 44 is not needed. FIG. 48 shows the joining of wall elements 720*a* and 720*b* with the connector piece 735*a*, which provides the same end-to-end distance between elements as would the center piece 710 in FIG. 44.

Figure 49:
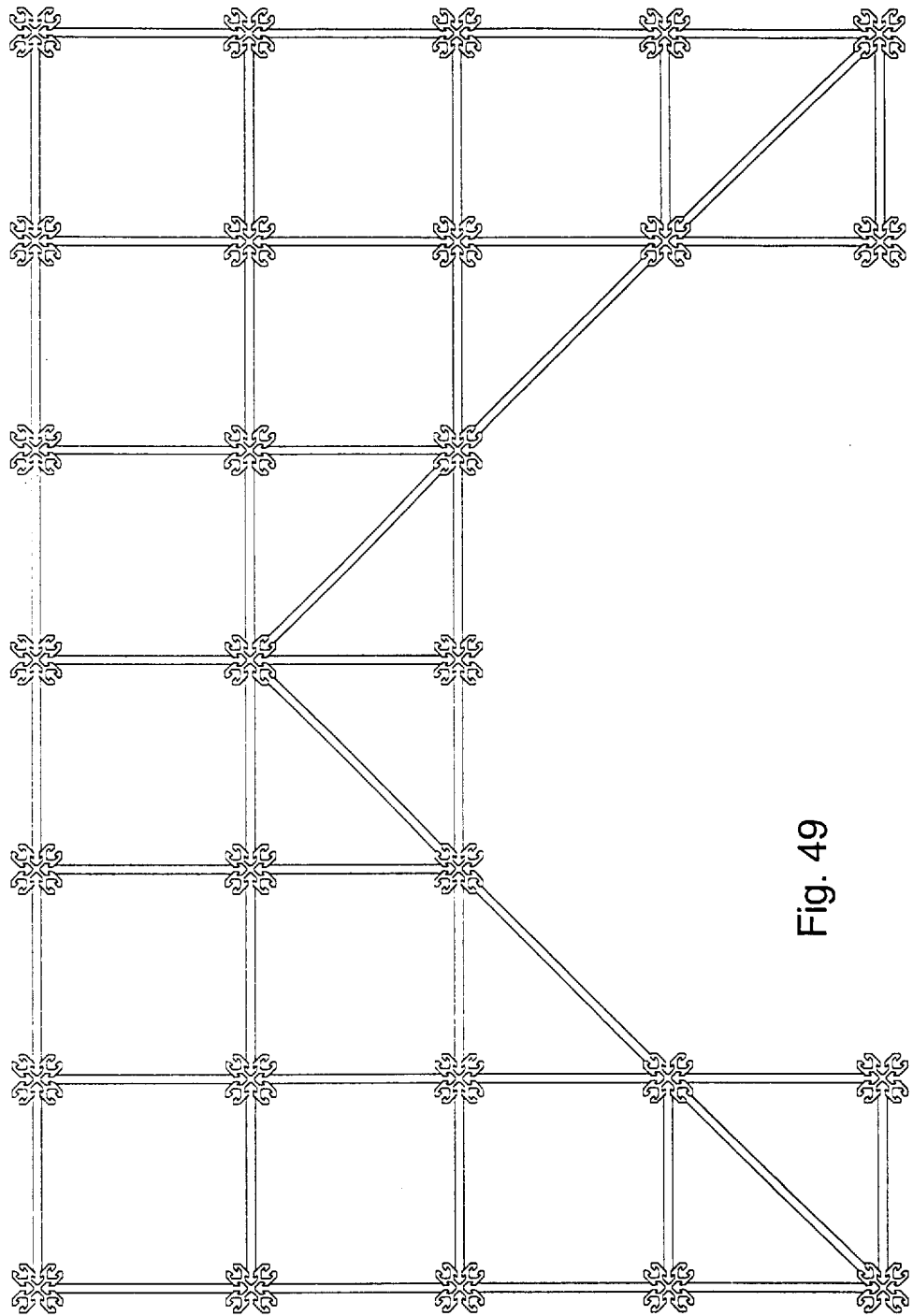
FIG. 49 shows a large unit assembled from the joint and plate units of FIGS. 34 and 45 respectively.

FIG. 49 shows an array of storage-cubbies made of shorter horizontal and vertical wall elements and longer diagonal elements joining with the multi-mate-featured cross-piece of FIG. 44. The joint is considered complete with only the horizontal and vertical wall elements since the full compression and tension condition still applies without diagonal members. Adding diagonal members or terminator elements in the 45° mate locations in the joint center piece would, however, further strengthen the joint.

The same structures of the above-mentioned embodiments can also be applied to more user-customized designs. For example, the wall elements in FIGS. 17, 21, 26, 27, 32, 35 and 45 all include the wall component integral to the whole element. The elements in FIGS. 50 through 68 decouple the end component from the wall component while maintaining the same structural system capabilities.

Figure 46:
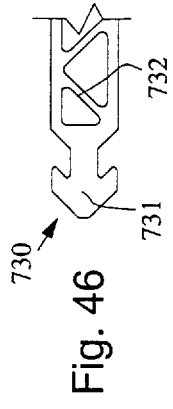
FIG. 46 shows how a plate with barbed ends can be made to have a truss section between the barbs to minimize weight and maximize strength.

FIG. 50 shows the single male barb end clip 750. The male barb 751 is the same as elements 720 and 730 in FIGS. 45 and 46 respectively, and will thus mate with female mate elements such as that of FIG. 44 and the connector element of FIG. 47. This end clip, in addition, has an open jaw and gap in which a separate wall component element can be attached. The jaw is comprised of jaw walls 752*a* and 752*b* which have jaw teeth 753 on the interiors. These teeth are used to grip and engage a wall element. Stop limit tabs 754*a* and 755*b* provide an end limit for inserted wall components, while open arch 756 not only reduces cross-sectional area (important for extrusion simplicity and cost) but provides a convenient through-way for a long bolt to anchor the element to a wall or other structure. Shoulders 755*a* and 755*b* add strength to the clip structure and also increase joint rigidity by engaging more surfaces with a joint center cross-piece, simultaneously bracing diagonal clip elements shown in FIG. 52.

FIG. 51 shows the end clip 750*a* mated with a wall component element 760, which can be any common shelving material, such as wood, plastic, or composite or the like. The end surface 761 of wall element 760 is stopped at limit tab 754*c* while the jaw teeth are embedded into the wall material. For example, teeth 753*a* on jaw wall 752*c* engage with the wall surface 762*a*, while teeth 753*b* of jaw wall 752*d* engage with wall surface 762*b*. The remaining voids between the jaw wall and the wall component 760 can also be filled with glue or epoxy, if desired, to provide more gripping structure. The wall element 760 can be pressed into the clip either in the direction of the clip centerline (horizontally in FIG. 51), which will tend to spread the jaw walls, or in the direction of the clip joining axis ("into the page" in FIG. 51).

FIG. 52 shows a joint of end clips 750*b–e* with wall elements 760*b–e* attached, all mating with center joint piece 7 10*a*. An end clip 750*f* with wall element 765*a* engages with the center piece 710*a*. It can be seen that clip shoulders 755*e* and 755*f* on clip 750*e* abut center piece shoulders 713*a* and 713*b*, strengthening the attachment of clip 750*e* into the center element 710*a*. Also, on diagonally-attached clip 750*f*, having no center piece shoulders available to abut, clip shoulder 755*c* rests on clip wall 752*c* of clip 750*c*, and clip shoulder 755*d* rests on clip wall 752*d* of clip 750*d*. This adds strength to clip 750*f* in wall element 765*a*. A portion of a structure made of elements detailed in FIGS. 50–52 is shown in FIG. 53. So long as the diagonal wall member has proportionate length to the cube sides, the storage-"cubby" opening can be scaled to practically any size.

Figure 57:
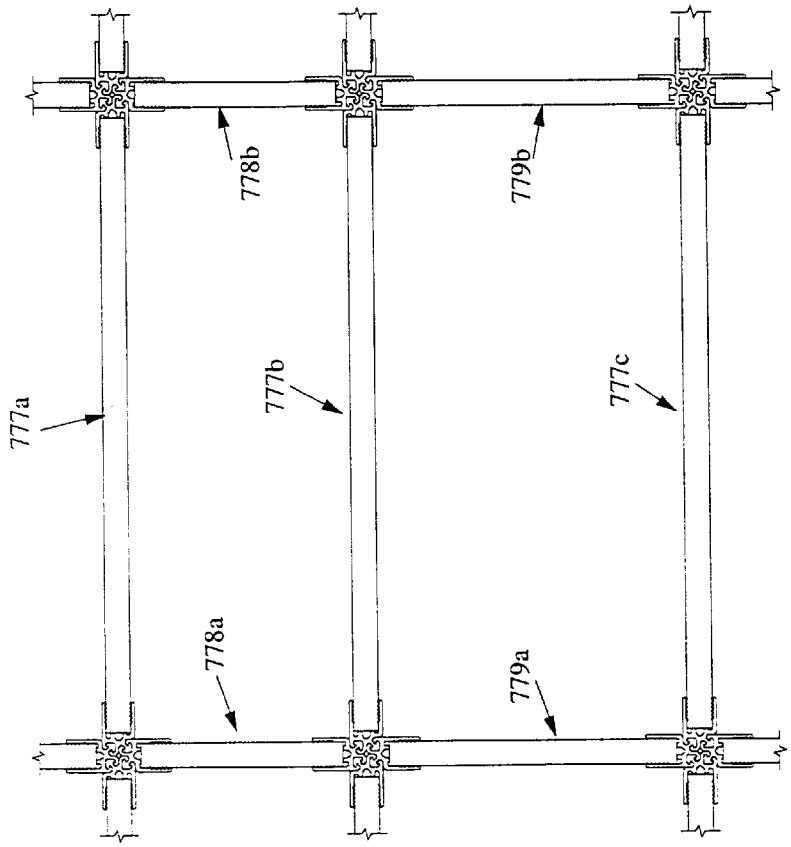
FIG. 57 shows how a structure can have storage-"cubbies" of various dimensions by using wall elements of different lengths.
Figure 54:
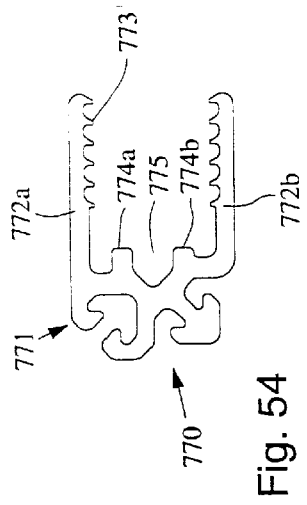
FIG. 54 shows another end clip with jaw teeth but with an axisymmetric barb end.
Figure 55:
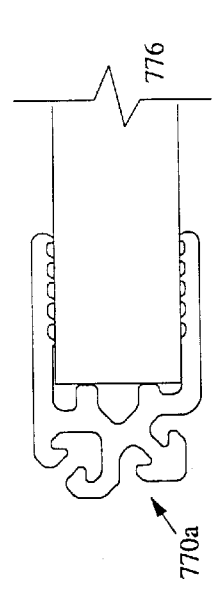
FIG. 55 shows the axisymmetric end clip with a wall component engaged with the jaw teeth.
Figure 56:
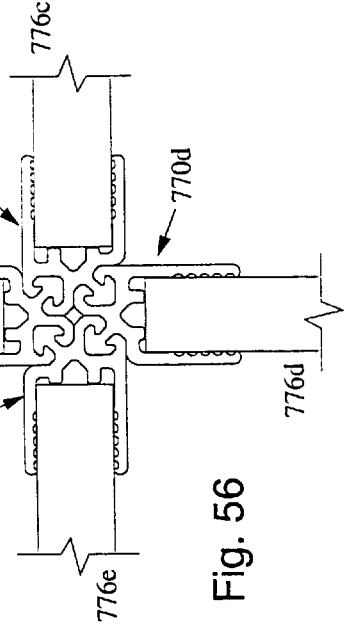
FIG. 56 shows a joint made up of four axisymmetric end clips with wall components attached.

FIG. 54 shows an end clip similar to element 750 but with a different joint end geometry. End clip 770 has joint end 771 of the axisymmetric one-barb-one-mate geometry for 90° inter-element angle connection. The jaw has jaw walls 772*a* and 772*b* with jaw teeth 773. Inside the jaw are limit tabs 774*a* and 774*b* and open arch 775. This end clip functions in the same way as the clip in FIG. 50. FIG. 55 shows this 90° axisymmetric clip 770*a* with wall component element 776. FIG. 56 shows a close-up of a joint. End clips 770*b–e* with wall components 776*b–e* attached interlock and complete a joint. Since all wall members are at 90° to one another, the structures that can be made with the axisymmetric end clips, and custom-length walls are more variable than fixed walllength structures. For example, FIG. 57 shows a portion of a structure formed by end clips and wall elements. Wall elements 777*a*, 777*b* and 777*c* are horizontal cross members of equal length, while wall elements 778*a*, 778*b*, 779*a* and 779*b* are vertical members. However, members 778*a* and 778*b* are equal in length but are shorter than members 779*a* and 779*b*. Thus, by using wall members of different lengths, variable opening storage"cubbies" and shelves can be constructed easily.

Figure 58A:
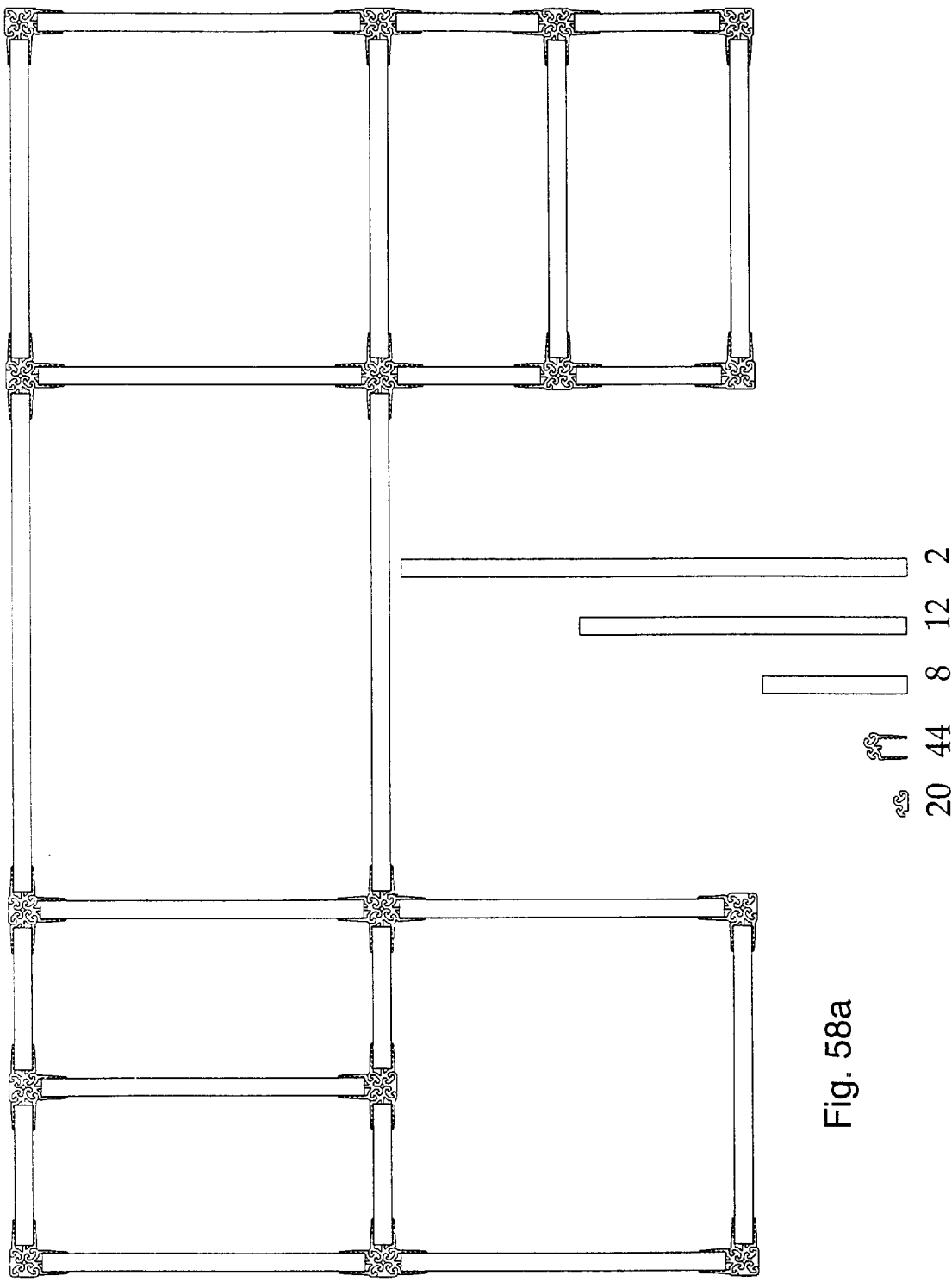
FIG. 58a shows a bridge-type storage array.
Figure 58B:
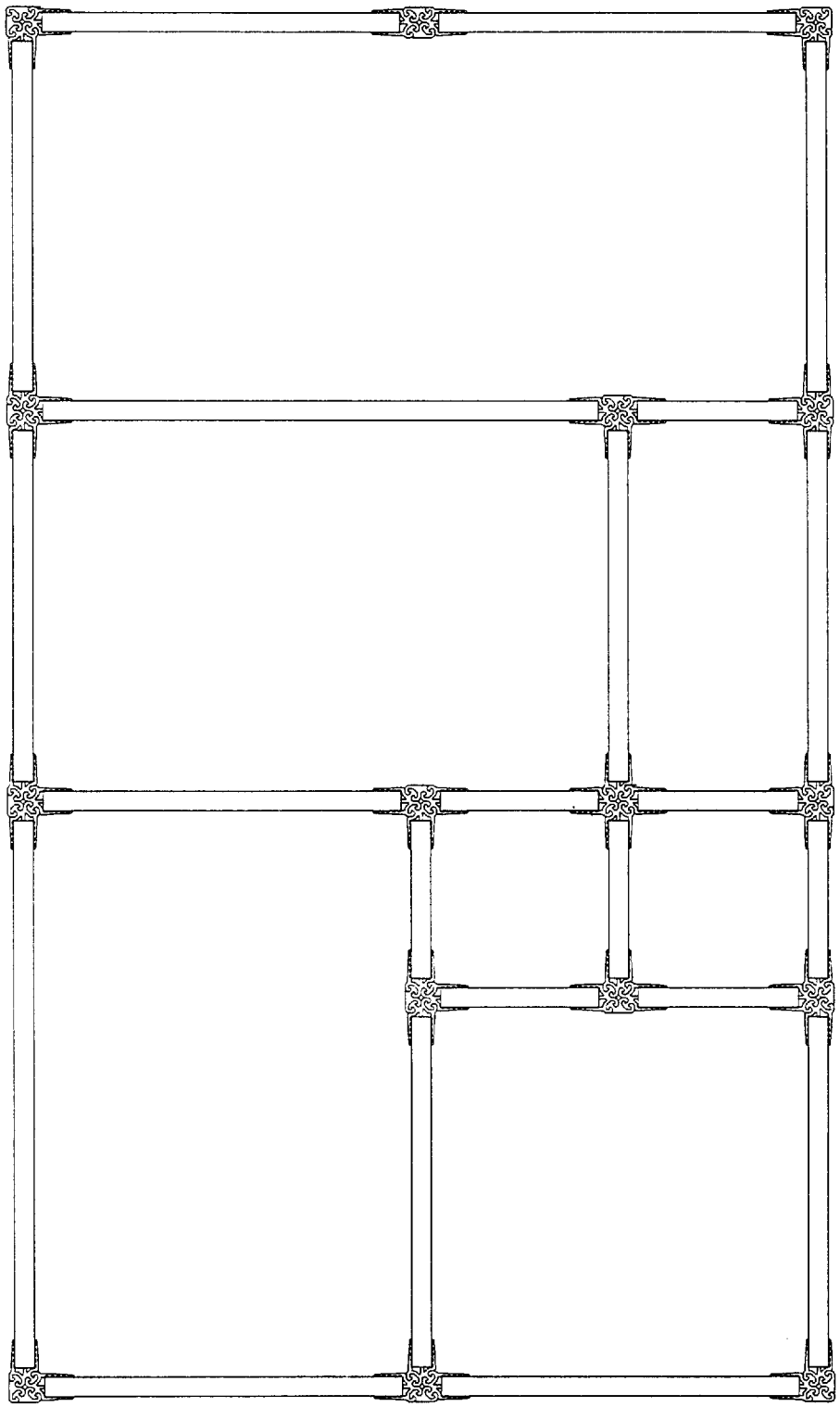

FIG. 58*s* illustrates a bridge-type structure that can be assembled using 20 terminator elements, 44 end clips, 8 short wall elements, 12 medium-length wall elements, and 2 long wall elements. FIG. 58*b* shows a structure with variable-size storage openings that is made with the exact same number of terminators, end clips, and wall elements as in FIG. 8*a*. While the number of T-joints, cross-joints, corners joints, and extension joints differ between the structures in FIG. 58*a* and FIG. 58*b*, however no additional joining elements are required, nor are there any leftover elements not used when changing structures, despite the differences in joint configuration. For other structure configurations, a minimal number of extra elements (either terminators or end elements) may be required, as opposed to obtaining addition T-brackets, elbow-brackets and cross-brackets. The end elements and terminator elements can be interchanged to form T-, cross-and elbow-joints. Also, one would only need to acquire additional end elements and terminators, as opposed to obtaining, for example, a cross-bracket to replace a T-bracket that would then go unused and wasted.

The use of end clips with separate wall elements also allows the user to select wall component size and material according to specific needs. One of the major deficiencies of commonly-sold plastic crates is that the crate sides tend to buckle when the crate opening faces the side. The walls are often not sufficiently stiff to prevent this mode of deformation, not evident when stacked with openings upwards. The use of separate wall components allows a user to select a more appropriate material to prevent this buckling. For example, standard thickness pine wood boards can be used, which has greater stiffness than the relatively flexible plastic used in retail crates, and is cost-competitive as well. For lighter or heavier storage loads, boards of other thicknesses and stiffnesses can also be used instead. In stores, pre-attached board-and-clip products can be sold alongside separate boards of varying length and separate end clips. Thus, the customer wanting ready-made, minimal-assembly shelving solutions can purchase the pre-attached products, while customers with other structure requirements can buy separate pieces and boards, and also have the boards cut to specific dimensions on-site or elsewhere.

The boards, furthermore, need no special finishing or preparation; and whereas other shelving methods require dovetail grooves or other end features to be made, the boards of the invention need only be cut to length with no special features to fit with the end clips.

For added gripping strength between end clips and wall components, screws can be used. FIG. 59a shows a single barb end clip 750g mated with a wall element 780a. Flat-end screws 781a and 781b can then be driven into the assembly further to prevent detachment of the wall from the clip. The flat-head screws provide this engagement while not rising above the clip jaw wall surface. However, if the clip is made of a relatively brittle material, flat-head screws can cause unwanted fracture at the screw hole. In this case, flat-underside screws such as panhead or roundhead screws can be used. FIG. 59b shows such usage. 90° axisymmetric barb end clip 770f is engaged with wall component 780b, while screws 781c and 781d thread into the two sides of the wall piece.

FIG. 60 shows another variation of the end clip. 90° axisymmetric end clip 792 has less-protrusive teeth 793 that provide a constant open gap width. These flat features also provide more surface area on which adhesives can join to a wall element without marring or penetrating the wall surface.

For applications and structures in which wall components are to be of different wall thicknesses, the end clips can be made with different jaw gaps without affecting joint assembly. For example, FIGS. 61a–c show the 90° axisymmetric end clip with different gap widths. Clip 792a is mated with wall element 780c, while clip 792b and clip 792c are mated with wall elements 780d and 780e of decreasing widths, respectively. Despite the different wall thicknesses, these clip-and-wall assemblies can all join together because the joint ends remain the same.

FIG. 62 shows that the end clips can be attached to different edges of a wall element. Clip 790a mates with wall edge 786 at interface 791a while clip 790b mates with wall edge 787 at interface 791b. Note that, if desired, the angle β at corner 788 between edges 786 and 787 need not be 90°, and thus structures need not be built in equiangular configuration. Wall element 785, for example, could be any polygon shape and have attached end clips and wall components on any and all of the polygon edges.

FIG. 63 shows another end clip 870. This end clip has non-protruding back-angled jaw teeth 871 and a limit tab 872. FIG. 64 shows a trussed wall element 875 with mating teeth 876a–d. These elements can be used to form a clip-and-wall assembly as shown in FIG. 65. End clips 870a and 870b attach to the trussed, toothed wall element 875a. The teeth 871a on clip 870a mate with the teeth 876e on the trussed wall as the end of the wall element abuts limit tab 872a. This assembly may be used without added screws or assemblies as the back-angled teeth function similarly to the barbs ends; up to a strength limit, the harder the wall element is pulled, the stronger the resistance.

Obviously, other joint end geometries may be employed with the non-protruding constant gap width teeth. FIG. 66, as an example, shows the symmetric single male barb with back-angled teeth.

FIG. 67 shows a completed axisymmetric joint using two end clips 870c and 870d and two terminator elements 874a and 874b. An equivalent connection element 880 is shown in FIG. 68. This connection element has the same back-angled teeth 882a and 882b and a trussed midsection, which reduces component cross-sectional area, thus lowering manufacturing cost and decreasing component weight while providing equivalent structural properties.

These constant-gap clip elements of FIGS. 63, 66, 67 and 68 can be used with common wall elements, as shown in FIG. 69a. End clips 870e and 870f engage with wall elements 885a and 885b respectively, while a connector element 880a mates the wall elements. The gaps 883a–d provided by unfilled teeth voids can be partially filled with a glue, adhesive or epoxy, again adding more strength to the interface. These same end clips and connectors can also be used with appropriately-toothed wall elements as shown in FIG. 69b. End clips 870g and 870h mate with trussed wall elements 875b and 875c respectively, while connector 880b mates the two wall elements.

The embodiments described above mainly involve the design of the joint ends. However, the structural systems can be further described and developed by novel design of the wall members; specifically by a truss design that provides both structure and features with the same physical members. A truss maximizes the strength-to-weight ratio, and thus minimizes cost. These design considerations and the related attachments also involve the joint embodiments described above.

FIG. 70 shows a corner joint element 887 equivalent to two interlocked end clips. FIG. 71a shows that corner element 887a can interlock with terminator 874c and end clip 870i to form a T-joint. It is evident that a single piece T-element can similarly be made, with or without barb features to accommodate an interlocking element or terminator. FIG. 71b shows a cross-joint comprising of two corner elements 887b and 887c. Again, a single cross-piece element may be made.

FIG. 72 shows a wider-jaw end clip 890 like that in FIG. 63 next to two thickness adapter elements 892a and 892b. The end clip 890 has jaw teeth features 891, and the thickness adapters have outer teeth features 893a and 893b, and inner teeth features 894a and 894b. FIG. 73a shows how one set of two thickness adapters 892c and 892d mate with the end clip 890a. For example, top thickness adapter 892c has outer teeth 893c mating with end clip jaw teeth 891a. Separate wall element 895a fits inside end clip 890a between the thickness adapters. The top surface of wall 895a interfaces with inner features 894c on thickness adapter 892c. FIG. 73b shows that a second set of thickness adapters 892f and 892g can interface with the outermost set of thickness adapters 892e and 892h which are interlocks with end clip 890b. The wall element 895b, thinner than wall element 895a in FIG. 73a, can then reside between both sets of thickness adapters in the end clip. These thickness adapters allow a single design of an end clip to accommodate different thicknesses of wall elements. Also, as with the elements in FIGS. 60–61, the end clips will still interlock with one another as long as the end features are the same, regardless of wall thickness.

FIG. 74 shows two trussed wall elements. FIG. 74a shows an 90° axisymmetric joint element 900 with axisymmetric truss design. A rotation of 180° results in the identical element. The wall component is composed of outer walls 901 and 902, with truss members 903. Each truss hole 904 is formed having a major vertex 905 and two minor vertices or corners 906.

FIG. 74b shows a 90° axisymmetric-joint element 910 with single-axis truss symmetry. A mirroring of the element along the centerline shown results in an identical truss (although the joint ends are not identical as they are axisymmetric). The wall element has two outer walls 911 and 912 separated by trusses 913. Each truss hole 914 has a major vertex 915 and minor vertices 916. The following derivations and development will be carried out with respect to the axisymmetric truss of FIG. 74a, but can be similarly done for the symmetric truss of FIG. 74b.

FIG. 75 shows one half of an axisymmetric truss wall with structural element variables: overall element thickness T; element length L; wall thickness $t_{wall}$; truss wall thickness $t_{truss}$; truss angle β; minor vertex radius r(β); major vertex radius r*; center-to center spacing 1.

Some of these variables are dependent upon manufacturing constraints and best practices. However, these constraints can be met while other non-critical dimensions can be optimized for functional reasons. For example, truss thickness $t_{truss}$ is often thinner than outer wall thickness $t_{wall}$ due to cooling rates in extrusion processes.

Functionally, if these trusses can be made geometrically symmetric, then accessories can be attached with proper fit and guaranteed alignment, while still allowing for user changes and variation. A critical feature in the truss is that at 901b the wall thickness $t_{wall}$ must be equal to the wall thickness at the major vertex of the truss hole 904b at 902b, as shown in FIG. 76.

As depicted in FIG. 77, rounded square center plugs 920a and 920b can be inserted truss holes 904c and 904d. These plug corners each have a radius r*(plug) equal to r*(hole), the radius of the truss hole. If these radii are designed properly, the centers of plugs 920a and 920b will be along the centerline of the trussed wall. This condition ensures that plug 920a has a vertex 921a fitting into the major vertex 905c of truss hole 904c while the opposite plug vertex 922a is tangent to the truss hole edge. Similarly, on plug 920b, top vertex 921b is tangent to the edge of truss hole 904d while opposite plug corner 922b fits in the major vertex 905d. FIG. 77 thus also shows that a rotation of a rounded square plug by any multiple of 90° or the placement of a plug into any truss hole does not change the center of the plug with respect to the wall centerline.

This special situation can be calculated from geometric analysis. The major vertex radius r* (in FIG. 75) of a truss hole is given by Equation (1):

$$r^* = t_{wall}\left(\frac{\cos\beta - \frac{t_{trust}}{2t_{wall}}}{1-\cos\beta}\right) = \frac{t_{wall}\cos\beta - \frac{t_{truss}}{2}}{1-\cos\beta} \quad (1)$$

Referring to FIG. 78, consider a trussed structural element 900b and an accessory 930 with center plugs 920c–f. The accessory can plug into the structural cross-section regardless of the accessory being "up" (FIG. 78a) or "down" (FIG. 78b) if the plugs and major vertices of the truss holes have radii r* determined by Equation (1).

FIG. 79a returns to a similar truss section 900c of FIG. 78 but now with an overlaid accessory 940 with small corner plugs 941a and 941b in truss hole 904d at its minor vertices. FIG. 79b shows the same accessory 940 rotated 180° fitting into the trussed element 900c. However, corner plug 941b now engages with a minor vertex of truss hole 904c while corner plug 941a fits into a minor vertex of 904e.

A close up of either plug is shown in FIG. 80. The plug 941 has acute angles of corners 942 and 943 of β, the same as the angle of the minor vertices of the truss holes 904 in FIGS. 75–79. Also, the radii of the corners 942 and 943 are r(β), the same r(β) of the truss hole minor vertices. In FIG. 79a and 79b, it can be discerned that the accessory 940 is constrained in the truss holes; no translation or rotation (in the plane of the figure) is free to occur.

FIG. 81 shows an accessory 950 with v-shaped plugs in parallel trussed wall sections 900d and 900e. Each plug is identical to plug 951a which has a rounded vertex 952a of radius r* determined by Equation (1). The accessory 950 would not be properly constrained if only plugged into one trussed wall segment (e.g. 900d or 900e alone), but when engaged with both trussed sections, it will not be able to translate or rotate (in the plane of the figure). Notice that the accessory 950 can be rotated 180° and fit identically as is shown in FIG. 81.

FIG. 82, as still a further example, shows an accessory 960 having four sets of v-plugs in a square structure 955 having four sets of truss holes. V-plugs 951c and 951d are repeated on each side of the accessory. Given the radius design by Eqn. (1), the accessory can be rotated by any multiple of 90° and fit identically to that shown in FIG. 82.

In FIG. 83, two corner plugs 941c and 941d and one v-plug 951e fit in truss hole 940f. In truss hole 904g, two corner plugs 941e and 941f and one square plug 920g fit without interference in the truss hole. It should also be evident that the two sets of plugs can be moved laterally one truss hole and still fit without interference. Thus, accessories employing different types of plugs can be used in the same truss section as long as there is no interference in the other dimensions. This condition is realizable, as the following accessory designs demonstrate.

Figure 84:
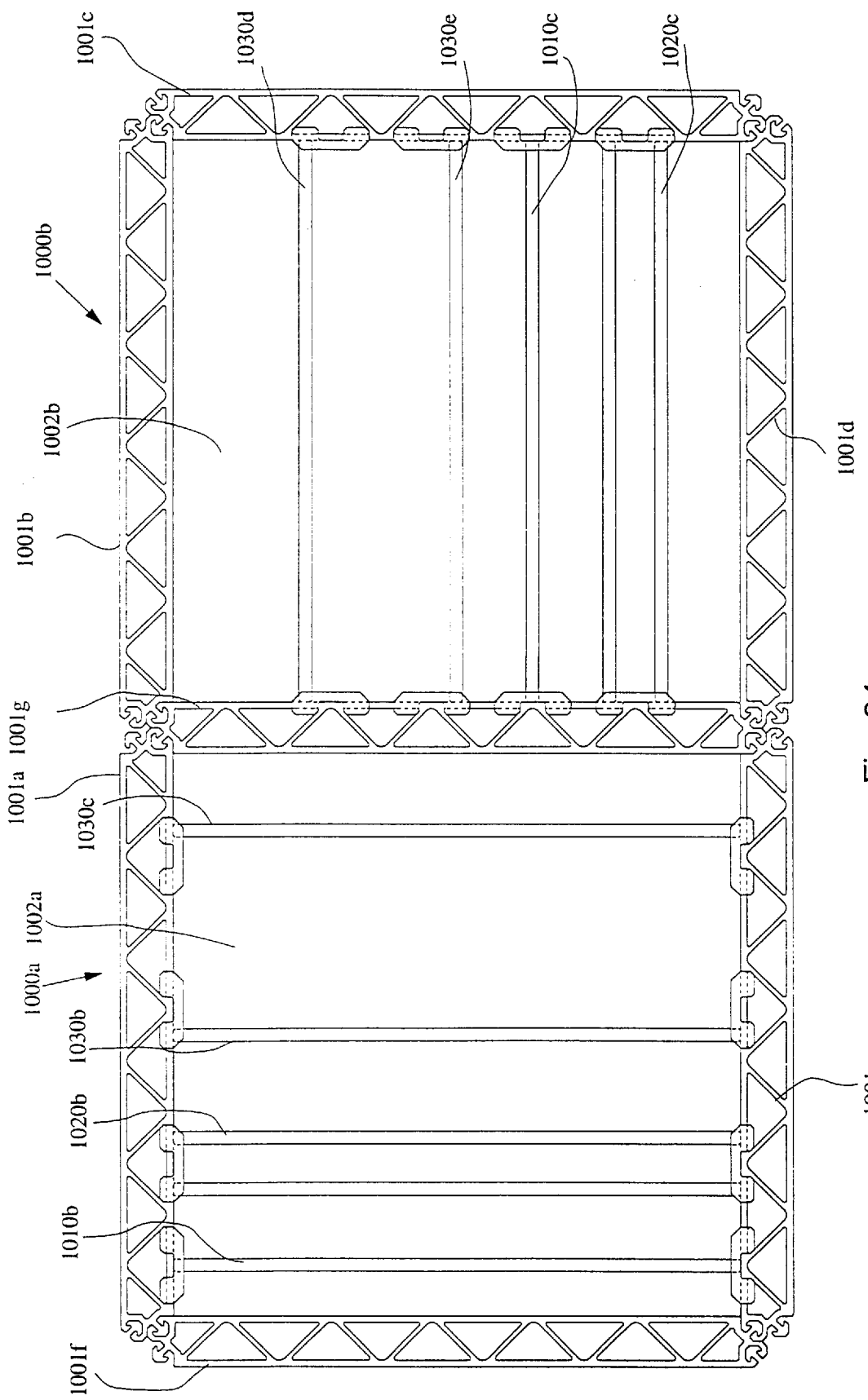
FIG. 84 shows two storage-"cubbies" comprised of axisymmetric, trussed elements like that of FIG. 74a with various styles of dividers having small corner plugs that locate the dividers at regular intervals along the trussed walls, and in which the dividers can be oriented either horizontally or vertically.

FIG. 84 shows two storage-"cubbies" 1000a and 1000b made of 90° axisymmetric structural elements 1001a–g. In the left storage-"cubby" 1000a, dividers 1010b, 1020b, 1030b and 1030c span the space 1002a vertically, while in the right storage-cubby 1000b, the dividers 11030d, 1030e, 1010c and 1020c span the hole space 1002b horizontally. It should be noticed that dividers are identical 1010b and 1010c, as is divider 1020b to 1020c, as are dividers 1030b, 1030c, 1030e and 1030f. These dividers can be moved along the sides of the storage-"cubbies" at truss-hole increments.

FIG. 85 shows the divider type 1010 alone. It has a wall component 1011 and two identical ends 1012a and 1012b. FIG. 86 shows close-ups of the ends of the three divider types depicted in FIG. 84. For divider 1010a, the end 1012c attached to wall component 1011a has a backbone piece 1015 with corner plugs 1013a and 1014a, like those of FIGS. 79 and 80. Divider 1020a has two wall components 1011b and 1011c attached to the end 1022, identical to end 1012c of divider 1010a. Similarly, divider 1020a has an off-center wall component 1011d with end 1032, the same as ends 1012c and 1022. Other dividers can be made with different wall component configuration and with ends with different numbers of corner plugs at different separations.

These dividers of FIGS. 84–86 slide into the truss sections as shown in FIG. 87. Wall component 1041 of divider 1040 slides under the lower wall thickness 1046 of truss section 1045, while plug 1043 slides into the truss hole above wall thickness 1046 which fills in the gap 1044 of the divider end 1042.

While the divider is constrained at the front of a cubby hole, the leading edge of the divider is thus far not constrained. Hence, a constraining tab, shown in front and side views FIG. 88 can be used. Constraining tab 1050 has lateral limit tabs 1053*a*, 1053*b*, 1054*a* and 1054*b*, corner plugs 1051*a* and 1051*b* as described with FIGS. 79 and 80, a backbone component 1052, forming a gap 1055. As shown in FIG. 89, as divider 1040*a* slides into the trussed element 1045*a*, with divider wall component 1041*a*, gap 1044*a* and plug 1043*a* mating with truss wall thickness 1046*a*, the divider also mates with constraining tab 1050*a*. Divider wall component 1041*a* slides between the lateral limit tabs 1053*cd* and 1054*cd*. The constraining tab 1050*a* is attached to the trussed section as shown: corner tabs 1051*cd* and lateral limit tabs 1053*cd* and 1054*cd* are above and below, respectively, the truss wall thickness 1046*a*.

These dividers can also serve as drawer guides. Snap-on guide rails may also be added. Either vertical or horizontal drawers can be inserted into the subdivided storage cubbies.

Plug-over accessories can be used with dividers and drawers. Accessories with rounded square plugs as briefly described with FIGS. 77, 78 and 83, can take the form of an orthogonal connector, as shown in FIG. 90. The accessory 1060 has plugs 1063 to insert into truss holes as depicted in FIG. 97 and 78. Cut-outs 1065 provide volume clearance for other accessories such as divider end backbone components as shown in FIG. 91. The orthogonal plug in FIG. 85 is shown with the 90° axisymmetric barbed design with male barb 1062 and female mate 1061 in an orthogonal direction to the direction of the plug axes of symmetry.

FIG. 91 shows orthogonal plug 1060*a* being inserted into a trussed wall section 1045*b* over a divider 1040*b*. Note that clearance area 1065*a* of the plug is shaped so as to fit over the backbone component 1042*b* of the divider.

The orthogonal plug-in 1060*b* of FIG. 92 in truss wall section 1045*c* thus provides a means of attaching 90° axisymmetric wall elements described with FIGS. 27–31 and 54–61 to an existing structure in a different orientation axis. FIG. 92 shows in particular a wall element 1100 and two terminator elements 1110*a* and 1110*b* completing a joint with the orthogonal plug 1060*b*. Obviously any one of the added elements can be interchanged with any element having the appropriate joint end.

The orthogonal plug, where desired, can also feature joint ends of any other geometry as well. FIGS. 93*a–c* depict the orthogonal plug-in with the same plug shape 1063*a*, 1063*b* and 1063*c*, but with three types of joint ends: 90° axisymmetric end 1066; 45° axisymmetric joint end 1067; symmetric single male barb end 1068. The joint end may also be the round dogbone style of FIGS. 17–20 as well as any other type of design.

The invention also enables other components to be attached to the orthogonal plug-in having the appropriate joint end. For example, FIG. 94 shows a door attachment 1070 with axisymmetric barbed joint ends 1071*a* and 1071*b* attached to orthogonal plug-ins 1060*a* and 1060*b* respectively. The door accessory end has the barb 1073*a* and barb mate 1072*a* required to interface with any similar axisymmetric joint end. The door accessory also has shafts 1074*a* and 1074*b* that allow the rotation of door component 1075 with respect to the ends 1071*a* and 1071*b*. Note that the shaft may be fixed with respect to either the door component or the joint ends. FIG. 95 shows views of the front and along the shaft axis of a door accessory 1070*a*. The joint end 1071*c* is seen mated with orthogonal plug-in 1060*e*, and door component 1075*a* is fitted to shaft 1074*c*.

A proper design for this door accessory should not interfere with other accessories of a structure. For example, FIG. 96 shows how this door accessory 1070*b* is joined with plug-in 1060*e* which can slide into trussed wall section 1045*d* over an existing divider 1040*c*. In this configuration, the divider is now captured in place; removal of the divider requires the removal of the door accessory 1070*b*.

A door that allows for the independent attachment and detachment of a divider or similar accessory is shown in FIG. 97. Here a door accessory 1080 is a plug-in assembly not having any joint end features, only the v-plugs 1085 (1085*a–c* in the front view with hidden lines). The door accessory has plugs 1085 attached to plug-in end 1081. The door component 1083 and shaft 1082 allow the door component to swing as desired. Also, from the front view, the plug-in end 1081 has clearance voids 1084*a* and 1084*b*. As shown in FIG. 98, the voids 1085*d* and 1085*e* on plug-in end 1081*a* can accommodate the corner plugs 1013*a* and 1014*a* on divider 1010*d*. Thus, the divider and the plug-in door accessory can be attached and removed independently of one another.

This independence of insertion is maintained regardless of what attachments have been made on adjacent storage-"cubbies". FIG. 99 shows the side view of two storage-cubbies 1002*c* and 1002*d*. The lower storage-"cubby" 1002*d* has a divider 1040*e* slipped into trussed wall section 1045*e* and plug-in door accessory 1080*b* already in place. Storage-"cubby" 1002*c* already has divider 1040*d* inserted into trussed wall sections 1045*d* and 1045*e*. The additional plug-in door accessory 1080*a* has plug-in ends 1081*b* and 1081*c* (and plugs 1085*d* and 1085*e*). These plugs can thus be inserted into wall sections 1045*d* and 1045*e* over the divider 1040*d* without interference from any accessory. If the door component is swung out, exposing the storage-cubby, then dividers can be removed and inserted, as FIG. 98 has illustrated.

Another accessory is the plug-in plate of FIG. 100. This backplate 1090 has the plate component 1092, which can be solid or with holes to reduce weight and material, and a cavity 1093. It also has v-plugs depicted as 1091*a–c*. FIG. 101 shows that plug-in backplate 1090*a* can be attached to a structure with plugs 1091*d* fitting into a trussed wall section 1045*f* over an existing lateral constraining tab 1050*a* already in place. The constraining tab 1093*a* would be in the cavity 1093*a* of the plug-in backplate. If for some reason a divider were inserted from this direction instead of the lateral constraining tab, then backplate would also fit over it. FIG. 102 shows that a constraining tab 1050*b* can also be inserted after a plug-in backplate 1090*b* has been added to trussed wall section 1045*g*. The tab 1050*b* is pushed back into the cavity 1093*b* without interfering with backplate component 1092*a* and then forward to engage the trussed wall section 1045*g*. Obviously, the tab can be removed independently from the backplate plug-in accessory.

Figure 105:
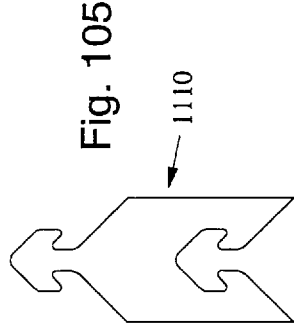
FIG. 105 shows how the concept of an extender can be applied to other end geometries such as the straight barb geometry.
Figure 104:
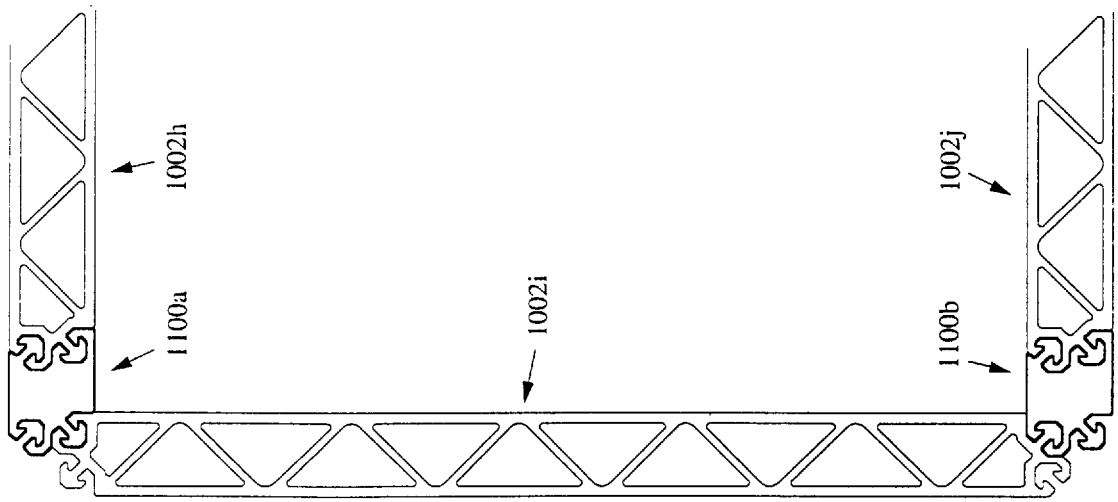
FIG. 104 shows one possible application of the extender in FIG. 103 in the construction of joined structures.
Figure 103:
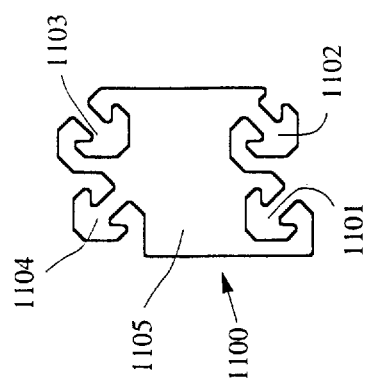
FIG. 103 shows an extender for use on an asymmetric element end to increase the element length.

Other accessories can also be employed. FIG. 103 shows an extender for the 90° axisymmetric joint end. In applications where a given wall element is not long enough, the extender 1100 can be fitted to the end of the element. It has reversed barb 1102 and reversed barb mate 1101 to join with a standard axisymmetric joint end, and also the standard barb 1104 and barb mate 1103. FIG. 104 shows a possible application of these extenders: extenders 1100*a* and 1100*b* are used in tandem to extend wall elements 1002*h* and 1002*j* respectively, to join with perpendicular wall element 1002*i*. The concept of an extender can also be used for joint ends of different geometries. FIG. 105 shows an extender 1110 for the single male barb joint end. This is not, however, the same as the connector for the single male barb end as shown in FIG. 47.

FIG. 106 shows how the 45° axisymmetric end elements 1200a and 1200b can interlock without forming the 45° inter-element angle. This is generally not desirable, since the strength of the joint is significantly weaker than a complete interlocking joints of FIGS. 37, 39 and 41. FIG. 107 shows how the 90° axisymmetric elements 1210a and 1210b can similarly be interlocked without forming the 90° angle. In storage applications, these joints can be potentially dangerous as the failure of a joint can lead to falling objects upon person or property. To prevent this, end features having asymmetric (not symmetric) barb features can be used. FIG. 108 shows the end of an element 1220 having one barb 1224 and one barb mate 1221. The opposite end of element 1220 would have the same features axisymmetrically oriented, so that a rotation of 180° results in the identical element ends, as are the previously described elements in FIGS. 27–31 and FIGS. 54–61. A close-up of element 1220 is shown in FIG. 109. The barb 1224 has barb head ends 1225 and 1226 that are dissimilar. In this example, barb head end 12256 has extra material as compared to barb head end 1225. Similarly, the geometry of the barb mate 1221 has vacancy 1222 different from vacancy 1223. The shape of barb head end 1226 is the same as barb mate vacancy 1223 while the barb head end 1225 has the same shape as vacancy 1222.

FIG. 110 shows two axisymmetric end elements 1220a and 1220b having asymmetric barb features. The dissimilar barb head features will not allow the barb to interlock in the barb mate as is possible with symmetric barb features in FIGS. 106 and 107 in this relative orientation of elements. For example, barb 1224a on element 1220a will not join with barb mate 1221b of element 1220b because the larger barb head end 1226a will not fit into the barb mate vacancy 1222b. FIG. 111 shows that the desired joint can still be formed with the axisymmetric elements with asymmetric barb features of FIGS. 108 and 109. Four elements 1220c, 1220d, 1220e, and 1220f interlock to complete the joint.

Up until now, the wall elements and plug-ins herein described have all been orthogonal in nature. That is, the axes of joining elements have been designed for 45° and 90° intermember angles. This is not a fixed requirement, however, or a limitation of the invention. The end clips and plug-ins can be made to employ an angle other than 45° or 90° between the axis of attachment and the direction of mating attached elements. For example, the plug-in door accessories of FIGS. 94 and 97 can have door components swinging on an axis at angles other than 90° from the plugs' insertion direction by forming the plugs at that desired angle with respect to the door direction. Similarly, end clips, such as those of FIGS. 50–62, can have the joint ends at an angle with respect to the centerline of the jaw components.

Also, the wall elements themselves can be cut at angles. Whereas for much of this invention description and for substantive purposes the storage-"cubbies" may have been assumed to be cubical in shape with 90° at every edge, the storage-"cubby" volumes may also be formed with non-perpendicular angles such as rhombohedral or some non-equiangular geometry. The joint ends and wall components need only be cut off-axis from the direction of joint sliding direction. The cross-section design need not be changed, as the direction of the sliding joint will always be maintained. Thus angled shelves can also be made.

The designs of the invention can be applied, moreover, to many modular design applications including but not limited to the above-described bookshelves, storage racks, modular office furnishings, home furnishings, semi-permanent housing shelters and structures, ceiling paneling, floor and wall paneling, lockers, and carrying cases and the like. The elements, as earlier described, can be made of plastics, metals, composites or practically any other material (or combination of materials) that has (have) appropriate material properties for the given application. While many of the embodiments described herein are most easily made by extrusion and injection molding, moreover, other manufacturing processes may also be used.

Suitable tools can be readily designed especially for the custom-fitting of the embodiments of the invention described above. A shearing tool can be designed, for example, such that the end clips and core elements can be cut at any angle required to make equiangular or non-equiangular storage-"cubby" systems. Material lengths, such as a long plastic extruded end clip strip, can be placed in a mating die tool, and a hand-operated shear can cut off the desired length without deforming either portion of the extruded strip. This device can be designed with a rotational adjustment between the shearing surface and the material so that angular cuts can be consistently and repeatably made. Similarly, the tools may also include a punch so that as the shear is brought down to cut off the desired section of an end clip strip, for example, a punch can make a hole in the jaw walls for screw installation during the same action. This device can also be motorized or pneumatically-driven to ease operation as is well known.

For the attachment of protruding-jaw-tooth end clips, an installation tool can be made to simplify the mating of the end clip onto the end of a board or wall component. The tool holds the end clip in place and prevents the jaw walls from spreading, and the wall component is pressed into the end clip in either the direction of the sliding joint axis or in the direction from the jaw gap towards the joint end. This force may be provided by either a hammer-like device where impacts force the two components together or by a press with a lever, like an arbor press. Once the two components are pressed together, the assembly is then removed from the tool, ready for joining with other such assemblies. The force may also be motorized or pneumatically-driven to increase installation rates with less user exertion.

While applications of the invention to many structures, including "cubbies" and toys are readily understandable, feasibility studies have been conducted that also admirably support the use of the structures of the invention in heavy load-bearing applications, as well, in competition with current construction designs for such uses.

A truss cross-section in wall components is generally known to provide a greater strength-to-weight ratio than solid sections. A study using finite element analysis (FEA) has been conducted to compare trussed beams to I-beams ("Structural analysis comparison of a square-hole beam and a triangular-hole beam" by Luis A. Muller of the Precision Engineering Research Group, Dept. of Mechanical Engineering, MIT. October 1995). A triangular-holed truss shown in FIG. 112a and a rectangular-holed truss of FIG. 112b are compared to the stiffness of an I-beam.

Results of center loading on a simply supported beam 305 mm long show that a triangular truss of 25 mm overall height, 25 mm depth, and 5.0 mm wall thickness, is nearly 100% efficient as an I-beam of the same overall height, whereas a square-hole beam only performs to 73% efficiency.

Also, analytical models show that the stiffness of a beam with separated and parallel plate surfaces is more effective than a single wall component of the combined thickness. For example, a beam of two 5.0 mm plates separated by 15 mm (overall thickness 25 mm), shown in cross-section in FIG.

113a, is 12.5 times as stiff as a single 10.0 mm plate beam of FIG. 113b. This is the result of a higher moment of inertia provided by the separation of plate elements from the beam centerline.

Considering likely materials and dimensions of a structural wall element with barbed joint features, first-order calculations of bending, buckling and strength have been conducted to show the feasibility of the designs and embodiments described above. (Outlined in, for example, Housner, G and Hudson, D. *Applied Mechanics: Statics*, D. Van Nostrand Company, Inc., 1949, and Shigley, J and Mischke, C. *Mechanical Engineering* Design, McGraw-Hill, 1989.) Rigid polyvinyl chloride (rigid PVC) is a common engineering plastic which can also be recycled and reused. It typically has a modulus of elasticity in the E=200000 psi to 600000 psi range. (McClintock, F. and Argon, A. *Mechanical Behavior of Materials*, Addison-Wesley Publishing Co., 1965. Pg. 258 (Table 6.4 Properties of Common Polymers.) Commercially-available rigid PVC products ("Vinyl Siding Product Standards & Specifications," Georgia-Pacific product brochure, 1993) have a value of E=360000 psi. For the following calculations, a value of E=300000 psi is used.

Consider a trussed wall element with the following geometry: b=12" deep shelf; l=12.5" from joint-end to joint-end; overall element thickness H=0.75"; wall thickness h=0.050". The moment of inertia I for separated plates is:

$$I = \frac{b}{12} [H^3 - (H-2h)^3)] \quad (2)$$

For as simply-supported beam with center loading, the deflection y at the center, also the maximum deflection, is given by:

$$y = -\frac{Fl^3}{48EI} \quad (3)$$

where F is the center load. Using the values given above, a load of F=400 lbs, for example, results in a maximum center deflection of only 0.37". In an array of structural cubbies, however, the ends of these beam-acting wall elements would be resistive to end rotation; hence the deflection would be less than this calculated value. Typical household objects weigh less than 400 pounds; thus, the deflection of the walls under distributed loading would be less than the example calculated value.

An array of storage cubbies containing objects would stress the bottom-most wall elements the most, as the weight of the upper storage cubbies would be carried by the bottom row of cubbies. Hence, first-order calculations for buckling of vertical column wall elements are conducted. The first mode of buckling gives the lowest critical load of:

$$P_{crit} = \frac{\pi^2 EI}{4l^2} \quad (4)$$

where $P_{crit}$ is the load at which buckling will occur. For the given geometry of the wall element, the first mode of buckling has a critical load of $P_{crit}$=697 lbs. Also, since one storage "cubby" is composed of two vertical walls, the load would be shared by two vertical columns. Thus, the first buckling mode for a storage cubby would occur at twice the critical load calculated in Eqn. (4). Also, since the storage "cubby" is resistant against racking and diagonal forces at the joined ends, the storage structure could be capable of higher loading before failure.

The local wall segments within a truss have also been studied. A local wall segment that makes up the trussed wall element might buckle or fail, thereby weakening the entire wall element at a lower load than that calculated above. Hence, consider a thin wall column of l=1.4" tall, H=0.050" thick. The moment of inertia of this rectangular cross-section is:

$$I_{rect} = \frac{bH^3}{12} \quad (5)$$

From Eqns. (4) and (5), $P_{crit}$=47 lbs. Again, this is conservative, as the truss structure distributes the load throughout the truss wall members in constrained ways. Also, for each cubby wall element, the load capability is higher than the calculated value because each trussed element has two thin wall panels acting as columns. Since the wall segments are more like pivoting-ends or partially slope-constrained columns, a more accurate buckling load can be calculated. For buckling of a column with pivoting-ends (free to rotate), the critical buckling load is:

$$P_{crit} = \frac{\pi^2 EI}{l^2} \quad (6)$$

This results in a critical load of $P_{crit}$=188 lbs. Again, the maximum load is significantly higher because there are two thin walls per cubby element, and each cubby has two vertical members (one on each side).

The strength of a single barb of FIG. 54, for example, is also considered. The strength of an element is given by:

$$P = wb\sigma \quad (7)$$

where P is the failure load, and σ is the strength of the material. Rigid PVC has a typical tensile strength of T=6000 psi, but for safety considerations and creep behavior in plastics, a value of σ=1000 psi is used. Using a barb thickness of w=0.100", Eqn. (7) results in a value of P=1200 lbs. For a thinner barb of w=0.080", the failure load is P=960 lbs.

Applying Eqn. (7) to the trussed wall component, a thin wall segment of w=0.050" results in a maximum load of P=600 lbs. A thinner wall of w=0.040" gives P=480 lbs.

Thus, the first-order conservative calculations show that the structural properties of the trussed walls with barbed joint ends of the present invention can be made to withstand typical loads using a commonly-available, inexpensive, recyclable plastic. In addition to the formation of storage cubes, the extruded truss-type plate elements can also be used to form an equivalent of lightweight boards, as shown in FIG. 114. Here the truss structure 2000 has the same form as say element 1001b in FIG. 84; however, one edge 2001 may be concavely rounded, and the other edge 2002 may be correspondingly convex and mateable with edge 2001. In this manner, several of the boards could actually be bonded together. This type of truss-type board would allow for much lighter-weight shelving.

There will also be cases where the advanced extrusion technology required to crate wide truss-type sections can also be used to create replacements for boards used in applications like shelving. FIG. 115 like FIG. 114 shows a cross section that may be used for this purpose. In FIG. 115, the truss-board 2005 has edges 2007 and 2006 which are rounded, but may be any shape pleasing to the eyes.

Further modifications of the invention will also occur to persons skilled in the art, and all such are deemed to fall within the spirit and scope of the invention as defined by the appended claims.

What is claimed is:

1. Structural components for assembly into interlocking modular cube-type structures to form horizontal and vertical arrays of cubes, the components having pairs 8 substantially planar plates with angled and portions, with angled and portion having male protrusions and the other, motable female openings.

2. The structural components as claimed in claim 1 which has the male protrusions on one and the female openings on the other side of the plate end portions with surfaces thereof oppositely and divergingly angled substantially +and −45 degrees to the vertical of the plate and a mating plate where the locations of the male protrusions and the female openings are interchanged, thereby enabling cube-like structures to be assembled and to be interlocked together.

3. The structural components as claimed in claim 2 wherein the male protrusions are studs extending from said portions end of the plate on one side and the female openings are sockets in the opposite side end portions of the plate.

4. The structural components as claimed in claim 3 wherein the plates have opposite surfaces and are provided along their opposite surfaces with pluralities of interlockable similar studs and sockets for planar stacking.

5. The structural components as claimed in claim 1 wherein the plates, end surfaces and male protrusions and female openings are extruded from a common material.

6. The structural components as claimed in claim 1 wherein the plates are of identical construction with one end sharing double male elements and the other end having double female elements shaped interlockingly to dovetail with adjacent plates.

7. The structural components as described in claim 2 wherein one end portion bends at a +45 degree angle from the vertical the plate and the other end similarly bends at an opposite −45 degree angle from the vertical.

8. The structural components as claimed in claim 1 wherein one of plate has its end portions oppositely angled to the plate at +and - substantially 45 degrees to the vertical from the plane of the plate.

9. Structural components for assembly into interlocking modular cube-type structures to form horizontal and vertical arrays of cubes, the components having substantially planar plates with angled end portions each having matable male protrusions and female openings, the angled end portions having inside and outside opposing surfaces and, having the male protrusions on the inside surface and the female openings on the outside surface of the angles plate end portions, oppositely and divergingly angled substantially +and −45 degrees to the vertical to the plane of the planar plate, and mating with a similar mating planar plate where the locations of the male protrusions and the female openings are interchanged, thereby enabling cube-like structures to be assembled and to be interlocked together and wherein the male protrusions are studs extending from one of the end portions of the plate and the female openings are sockets in the other of the end portions of the plate , and wherein one end portion of each plate has studs on the inside surface and sockets on the outside surface and the other end portion of the plate has studs on the outside surface and sockets on the inside surface.

10. The structural components as claimed in claim 9 and in which the surface of the plate between its end portions has studs along one side and sockets along the opposite side.

11. structural components for assembly into interlocking modular cube-type structures to form horizontal and vertical arrays of cubes, the components having substantially planar plates with angled end portions each having matable male protrusions and female openings, the angled end portions having inside and outside opposing surfaces and having the male protrusions on the inside surface and the female openings on the outside surface of the angles end portions, oppositely and divergingly angled substantially +and −45 degrees to the vertical to the plane of the planar plate, and mating with a similar mating planar plate where the locations of the male protrusions and the female openings are interchanged, thereby enabling cube-like structures to be assembled and to be interlocked together, wherein one end portion bends at a +45 degree angle from the vertical to plate and the other end similarly bends at an opposite −45 degree angle from the vertical to the plate, and wherein one of the 45 degree angle end$_{13}$ portions of one plate is externally provided with a downward crook or step therein for receiving the opposite end 45 degree angle end portion of an adjacent plate.

12. The structural components for assembly into interlocking modular structures, each component having a plate portion and angled end portions each angled end portion having protrusions and openings for enabling matable assembly.

13. The structural components of claim 12 wherein the protrusions are in the shape of one of studs and barb arrows, and the openings are in the form of sockets of shape corresponding to that of the protrusions for receiving the same.

14. The structural components of claim 12 wherein the plate portion is substantially planar and the end portions are angled thereto at angles of substantially +and −45 degrees.

15. The structural components of claim 14 wherein the planar plates are provided along their opposite surfaces with pluralities of interlockable similar protrusions and openings.

16. The structural components of claim 14 wherein the angled end portions have opposing surfaces provided with said protrusions on one surface and openings on the opposing surface.

17. The structural components of claim 14 wherein the angled end portions of the plates have inner and outer surfaces, with the protrusions being carried on one surface and the openings on the other surface.

18. The structural components of claim 17 wherein the protrusions and openings on one angle end portion of the plates are disposed on the inside and outside surfaces thereof, respectively, and are disposed on the outside and inside surfaces, respectively, of the other angle end portion of the plates.

\* \* \* \* \*

UNITED STATES PATENT AND TRADEMARK OFFICE
CERTIFICATE OF CORRECTION

PATENT NO. : 5,888,114
DATED : March 30, 1999
INVENTOR(S) : Alexander H. Slocum and Christoper M. Ho It is certified that error appears in the above-identified patent and that said Letters Patent is hereby corrected as shown below:

In the Claims

Claim 1, should read:

1. Structural components for assembly into interlocking modular cube-type structures to form horizontal and vertical arrays of cubes, the components having pairs of substantially planar plates with angled end portions, with one angled end portion having male protrusions and the other, matable female openings.

Signed and Sealed this

Twenty-third Day of November, 1999

*Attest:*

Q. TODD DICKINSON

*Attesting Officer*    *Acting Commissioner of Patents and Trademarks*